United States Patent
Mori

(10) Patent No.: US 6,437,926 B2
(45) Date of Patent: Aug. 20, 2002

(54) IMAGE CAPTURE LENS AND IMAGE CAPTURE APPARATUS

(76) Inventor: Masao Mori, Fuji Photo Optical Co., Ltd., 1-324, Uetake, Omiya-City, Saitama 330-8624 (JP)

(*) Notice: Subject to any disclaimer, the term of this patent is extended or adjusted under 35 U.S.C. 154(b) by 0 days.

(21) Appl. No.: 09/808,220

(22) Filed: Mar. 14, 2001

(30) Foreign Application Priority Data

Mar. 21, 2000 (JP) .......................................... 2000-077702
Apr. 25, 2000 (JP) .......................................... 2000-124779

(51) Int. Cl.[7] .............................................. G02B 13/02
(52) U.S. Cl. ........................ 359/755; 359/754; 359/756
(58) Field of Search .................................. 359/755, 754, 359/756, 751, 750, 749

(56) References Cited

U.S. PATENT DOCUMENTS 5,589,988 A * 12/1996 Suenaga ...................... 359/755

* cited by examiner

Primary Examiner—Hung Xuan Dang
(74) Attorney, Agent, or Firm—Frommer Lawrence & Haug, LLP; Matthew K. Ryan

(57) ABSTRACT

An image capture lens and an image capture apparatus in which various kinds of aberrations are corrected and optical performance suitable for capturing images is obtained. Successively from an object side provided are a first lens group including a negative meniscus lens, a second lens group including a positive lens directing its convex to the object side, a third lend group including a first cemented lens composed of a bi-convex positive lens and a bi-concave negative lens, the first cemented lens having positive refractive power and directing its concave to the object side, a fourth lens group including a second cemented lens composed of a bi-concave negative lens and a bi-convex positive lens, the second cemented lens having negative refractive power and directing its convex surface to an image side, a fifth lens group including a positive lens directing its convex to the image side and a sixth lens group including a negative lens directing its concave to the object side.

11 Claims, 26 Drawing Sheets

FIG.3A

| Si (Surface No.) | ri (Radius of curvature) | di (Surface separation) | ndi (Refractive index) | νdi (Abbe No.) |
|---|---|---|---|---|
| 1 | 68.439 | 4.00 | 1.7495 | 35.0 |
| 2 | 29.078 | 2.06 | | |
| 3 | 131.000 | 7.00 | 1.7640 | 40.3 |
| 4 | -131.000 | 0.20 | | |
| 5 | 17.013 | 10.00 | 1.5691 | 71.3 |
| 6 | -40.341 | 3.29 | 1.4983 | 65.1 |
| 7 | 26.033 | 4.58 | | |
| 8 | 0 (Stop) | 7.49 | | |
| 9 | -10.764 | 2.11 | 1.7495 | 35.0 |
| 10 | 198.990 | 5.67 | 1.5691 | 71.3 |
| 11 | -17.809 | 0.20 | | |
| 12 | 554.080 | 5.39 | 1.7440 | 44.9 |
| 13 | -24.777 | 3.75 | | |
| 14 | -19.963 | 2.20 | 1.4983 | 65.1 |
| 15 | -27.171 | | | |

FIG.3B

| Magnification | d0 (Object distance) | d15 (Image distance) |
|---|---|---|
| -0.6 × | 121.88 | 65.17 |
| -1.0 × | 82.66 | 88.70 |
| -1.6 × | 60.61 | 123.99 |

| Conditional expression | Values for the condition |
|---|---|
| Expression (1) | $\delta\theta 3 = 0.0263$ <br> ($\theta 3 = 1.243$) |
| Expression (2) | $\delta\theta 6 = 0.0263$ <br> ($\theta 6 = 1.243$) |
| Expression (3) | 0.122 |
| Expression (4) | 0.96 |
| Expression (5) | $-0.49$ |

FIG.4

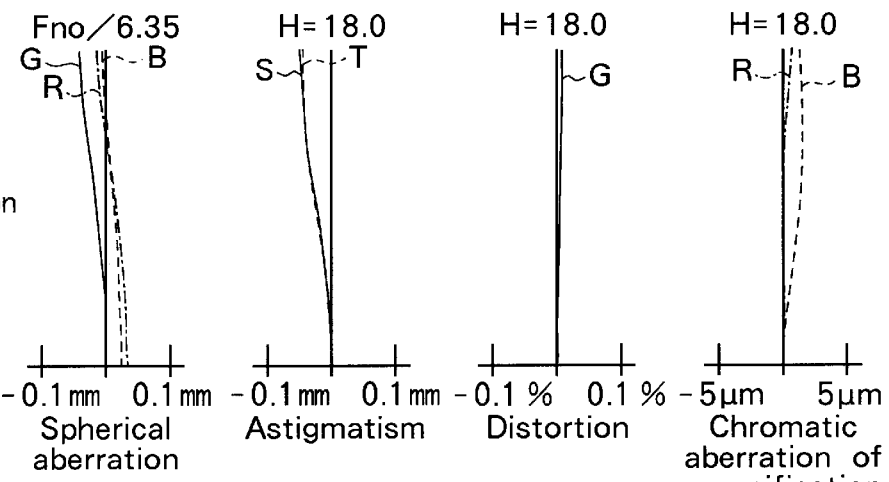
FIG.5A Magnification −0.6X
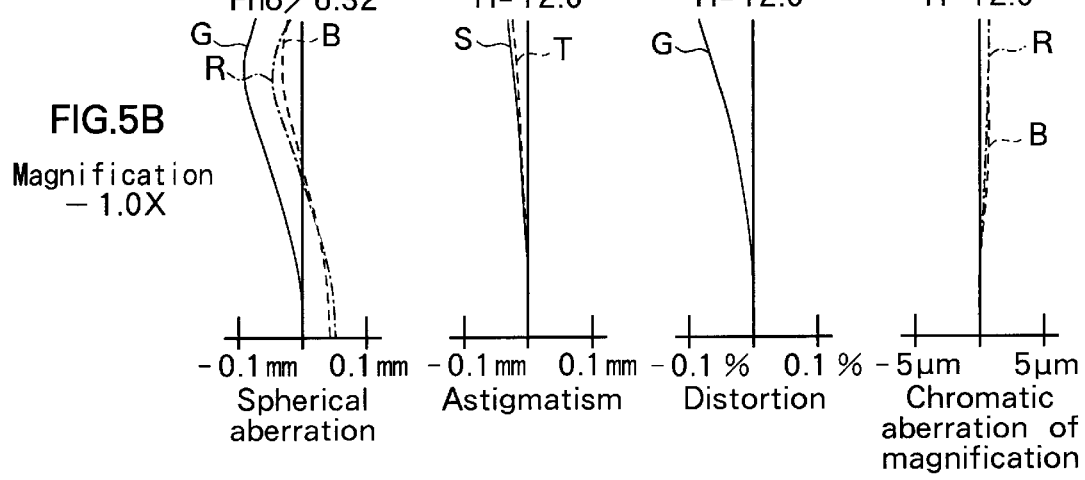
FIG.5B Magnification −1.0X
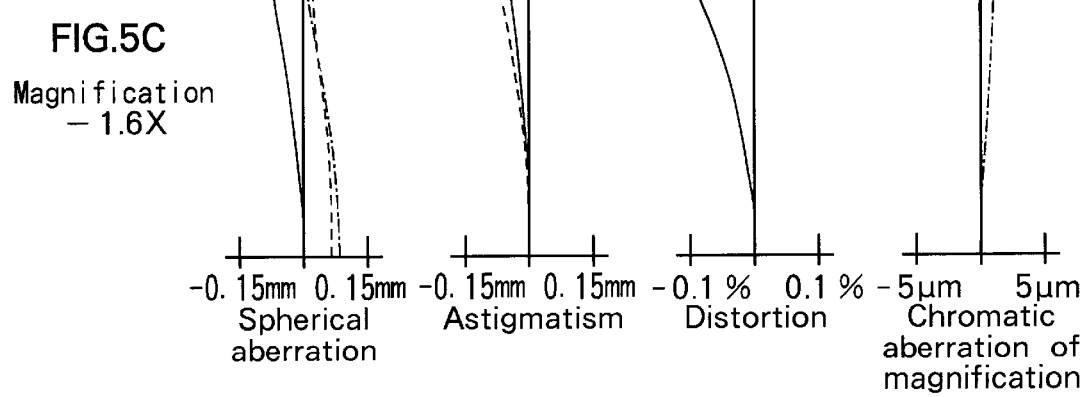
FIG.5C Magnification −1.6X

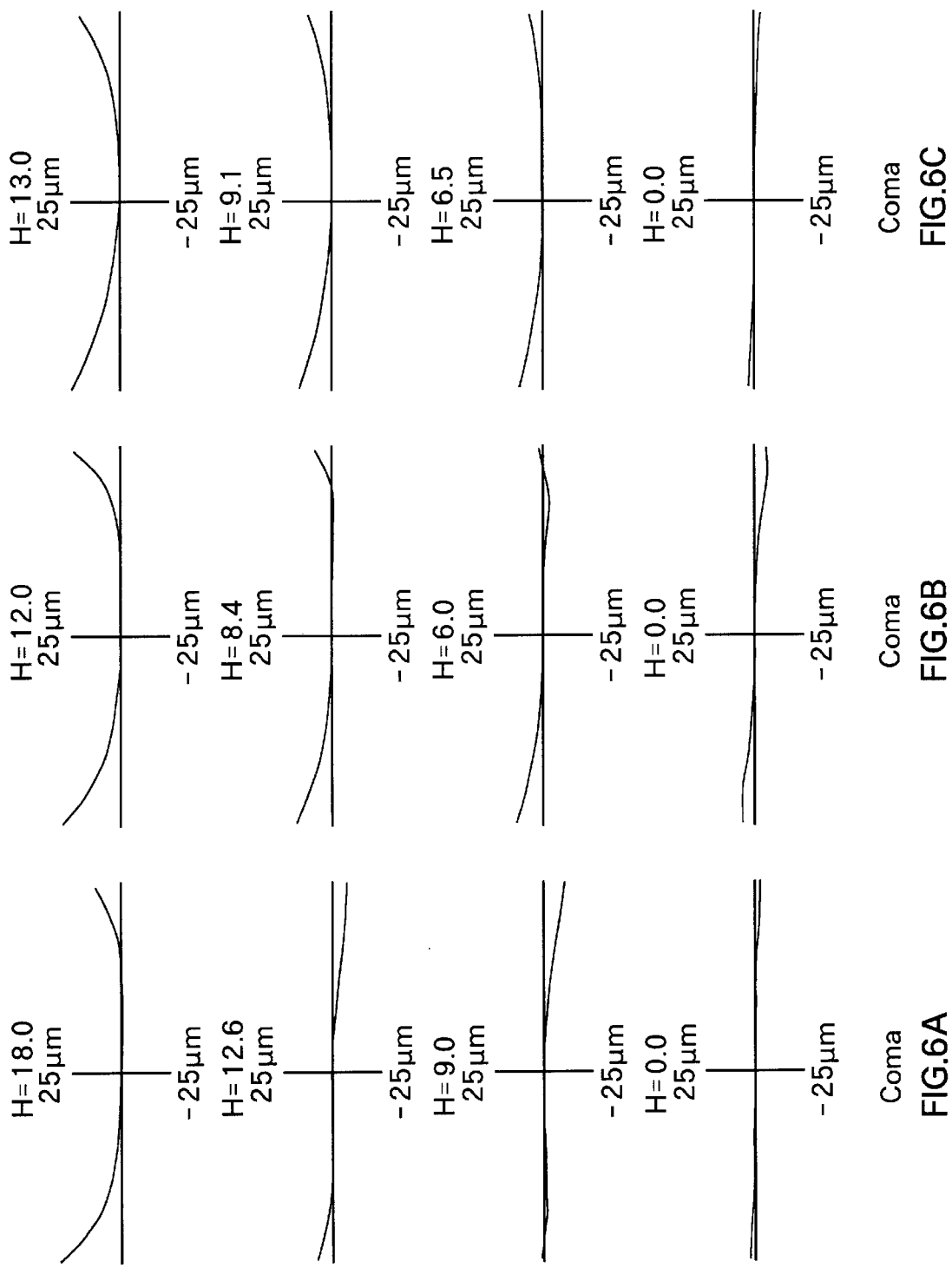

FIG.8A

| Si (Surface No.) | ri (Radius of curvature) | di (Surface separation) | ndi (Refractive index) | νdi (Abbe No.) |
|---|---|---|---|---|
| 1 | 67.029 | 1.50 | 1.7495 | 35.0 |
| 2 | 25.453 | 5.00 | | |
| 3 | 27.415 | 5.00 | 1.7440 | 44.9 |
| 4 | 2089.900 | 1.00 | | |
| 5 | 23.463 | 9.55 | 1.5691 | 71.3 |
| 6 | -21.957 | 1.20 | 1.5240 | 59.3 |
| 7 | 19.722 | 4.60 | | |
| 8 | 0 (Stop) | 5.40 | | |
| 9 | -14.980 | 1.20 | 1.7495 | 35.0 |
| 10 | 139.830 | 6.71 | 1.5691 | 71.3 |
| 11 | -19.566 | 0.20 | | |
| 12 | 110.820 | 5.39 | 1.7430 | 49.2 |
| 13 | -26.529 | 0.92 | | |
| 14 | -21.159 | 3.00 | 1.4983 | 65.1 |
| 15 | -73.692 | | | |

FIG.8B

| Mgnification | d0 (Object distance) | d15 (Image distance) |
|---|---|---|
| -0.6 × | 124.84 | 68.87 |
| -1.0 × | 86.82 | 91.68 |
| -1.8 × | 61.47 | 137.31 |

| Conditional expression | Values for the condition |
|---|---|
| Expression (1) | $\delta\theta 3 = 0.0263$ <br> ($\theta 3 = 1.243$) |
| Expression (2) | $\delta\theta 6 = 0.0263$ <br> ($\theta 6 = 1.243$) |
| Expression (3) | 0.119 |
| Expression (4) | 0.86 |
| Expression (5) | −5.29 |

| Si (Surface No.) | ri (Radius of curvature) | di (Surface separation) | ndi (Refractive index) | νdi (Abbe No.) |
|---|---|---|---|---|
| 1 | 66.918 | 2.42 | 1.7495 | 35.0 |
| 2 | 34.735 | 5.16 | | |
| 3 | 141.680 | 7.07 | 1.7640 | 40.3 |
| 4 | -141.680 | 0.27 | | |
| 5 | 16.365 | 10.20 | 1.4970 | 81.6 |
| 6 | -34.094 | 3.31 | 1.4983 | 65.1 |
| 7 | 29.905 | 4.04 | | |
| 8 | 0 (Stop) | 8.79 | | |
| 9 | -10.214 | 2.25 | 1.7495 | 35.0 |
| 10 | 201.480 | 5.87 | 1.5691 | 71.3 |
| 11 | -17.631 | 0.20 | | |
| 12 | 3569.100 | 5.42 | 1.7440 | 44.9 |
| 13 | -23.681 | 3.70 | | |
| 14 | -20.499 | 2.20 | 1.4983 | 65.1 |
| 15 | -28.423 | | | |

FIG.13B

| Magnification | d0 (Object distance) | d15 (Image distance) |
|---|---|---|
| -0.6 × | 120.57 | 63.81 |
| -1.0 × | 80.84 | 87.64 |
| -1.6 × | 58.50 | 123.40 |

| Conditional expression | Values for the condition |
|---|---|
| Expression (1) | $\delta\theta 3 = 0.0367$ <br> ($\theta 3 = 1.232$) |
| Expression (2) | $\delta\theta 6 = 0.0263$ <br> ($\theta 6 = 1.243$) |
| Expression (3) | 0.146 |
| Expression (4) | 0.80 |
| Expression (5) | −0.51 |

FIG.14

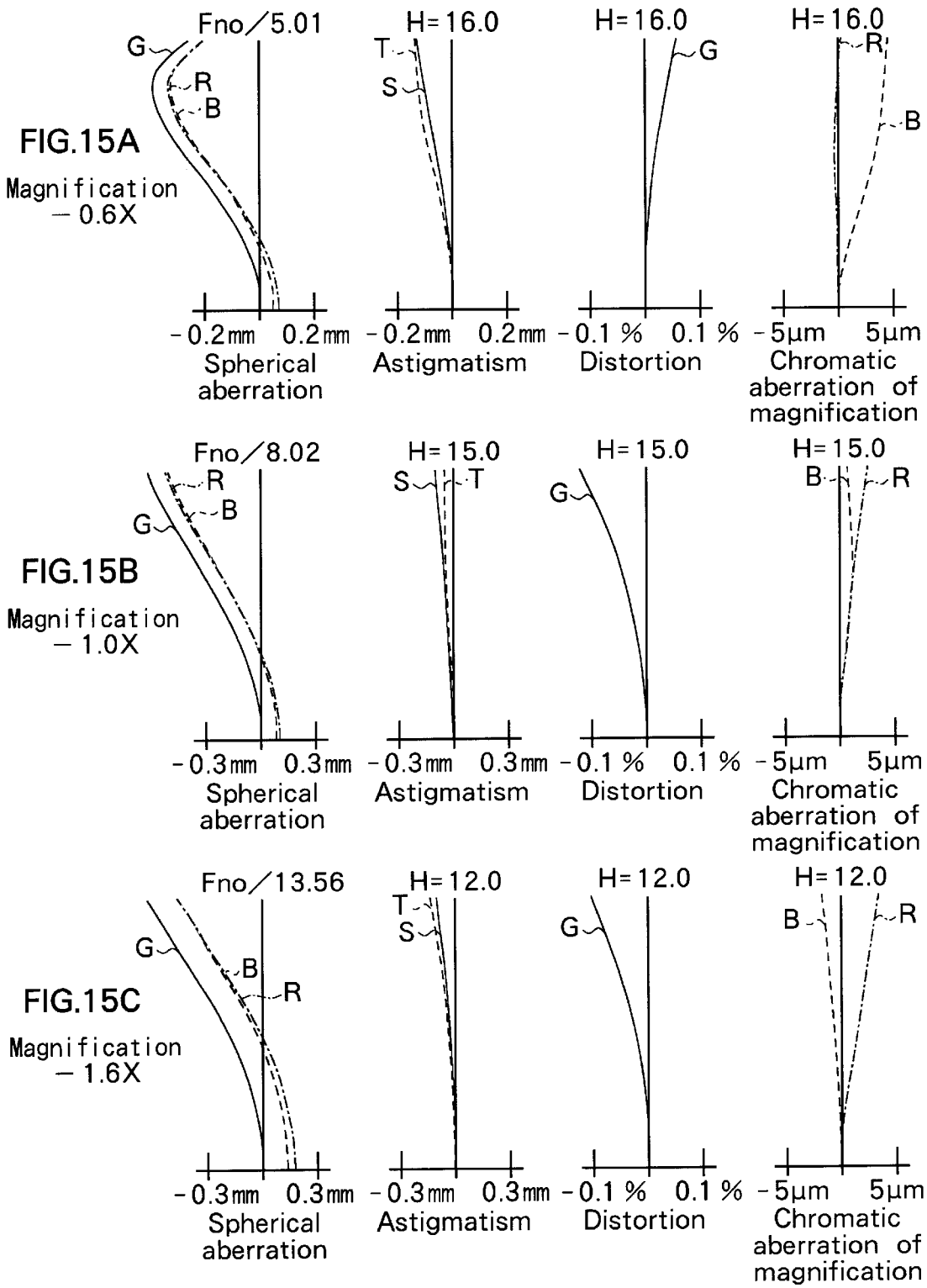

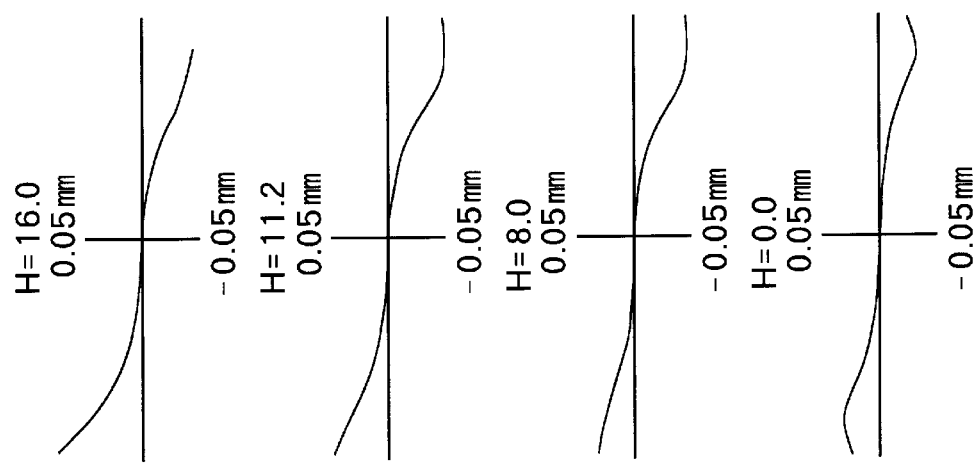
FIG.16A Coma
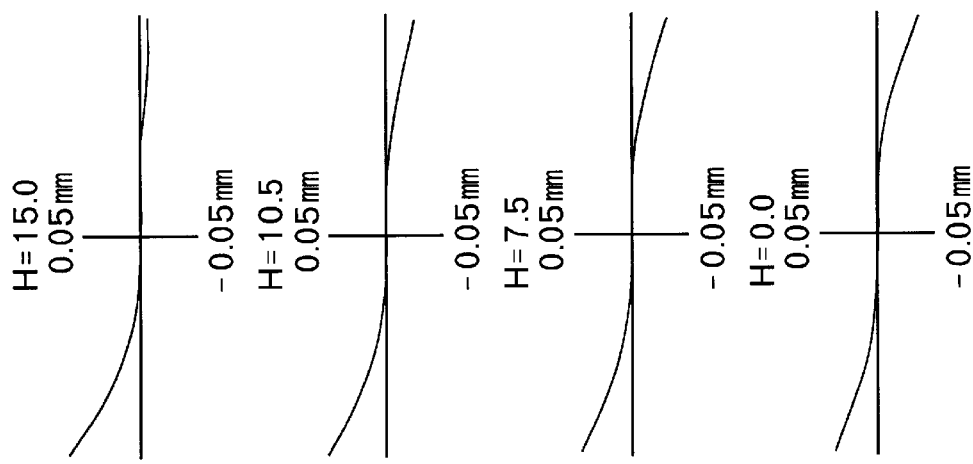
FIG.16B Coma
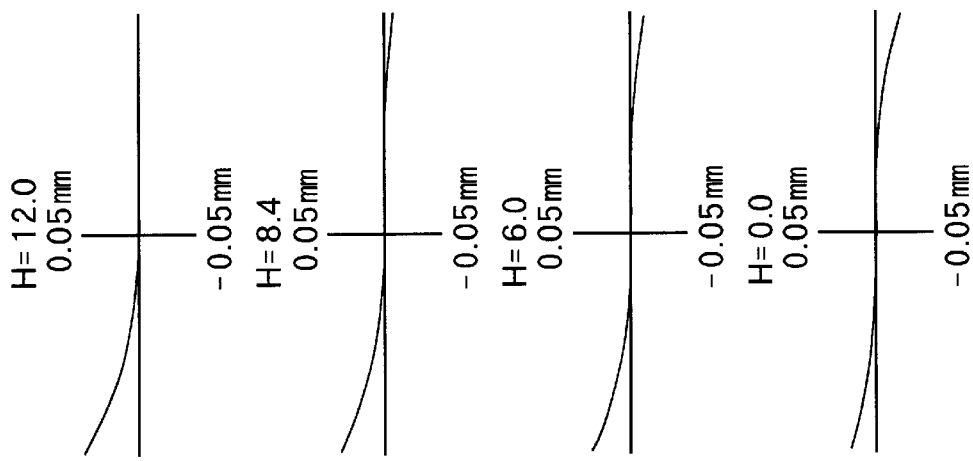
FIG.16C Coma

FIG.18A

| Si (Surface No.) | ri (Radius of curvature) | di (Surface separation) | ndi (Refractive index) | νdi (Abbe No.) |
|---|---|---|---|---|
| 1 | -23.868 | 2.00 | 1.7495 | 35.0 |
| 2 | -36.776 | 0.30 | | |
| 3 | 118.750 | 5.89 | 1.7440 | 44.8 |
| 4 | -41.748 | 0.30 | | |
| 5 | 28.430 | 10.59 | 1.5691 | 71.3 |
| 6 | -28.430 | 1.35 | 1.5814 | 40.7 |
| 7 | 25.775 | 6.00 | | |
| 8 | 0 (Stop) | 7.30 | | |
| 9 | -15.974 | 1.35 | 1.5182 | 59.0 |
| 10 | 21.553 | 12.52 | 1.5691 | 71.3 |
| 11 | -21.553 | 0.66 | | |
| 12 | 0.000 | 6.03 | 1.6204 | 60.3 |
| 13 | -29.783 | 1.47 | | |
| 14 | -21.236 | 2.30 | 1.5481 | 45.8 |
| 15 | -126.440 | 0.88 | | |
| 16 | 41.082 | 2.65 | 1.5182 | 59.0 |
| 17 | 24.891 | 3.73 | 1.7234 | 38.0 |
| 18 | 36.763 | | | |

FIG.18B

| Magnification | d0 (Object distance) | d18 (Image distance) |
|---|---|---|
| -0.6 × | 129.57 | 49.41 |
| -1.0 × | 92.46 | 71.67 |
| -1.6 × | 71.59 | 105.07 |

| Conditional expression | Values for the condition |
|---|---|
| Expression (1) | $\delta\theta 3 = 0.0263$ <br> ($\theta 3 = 1.243$) |
| Expression (2) | $\delta\theta 6 = 0.0263$ <br> ($\theta 6 = 1.243$) |
| Expression (3) | 0.124 |
| Expression (6) | 1.12 |
| Expression (7) | 0.45 |
| Expression (8) | 21.0 |

| Si (Surface No.) | ri (Radius of curvature) | di (Surface separation) | ndi (Refractive index) | νdi (Abbe No.) |
|---|---|---|---|---|
| 1 | 51.651 | 3.05 | 1.8052 | 25.5 |
| 2 | 28.751 | 5.50 | | |
| 3 | 31.621 | 4.50 | 1.7440 | 44.8 |
| 4 | 4940.300 | 0.15 | | |
| 5 | 23.989 | 9.63 | 1.5691 | 71.3 |
| 6 | −24.904 | 1.35 | 1.5145 | 54.6 |
| 7 | 19.617 | 3.50 | | |
| 8 | 0 (Stop) | 6.61 | | |
| 9 | −16.771 | 1.35 | 1.5182 | 59.0 |
| 10 | 23.957 | 10.01 | 1.5691 | 71.3 |
| 11 | −22.873 | 0.20 | | |
| 12 | 465.420 | 4.50 | 1.6405 | 60.1 |
| 13 | −30.238 | 1.38 | | |
| 14 | −20.126 | 2.50 | 1.5481 | 45.8 |
| 15 | 126.020 | 2.50 | | |
| 16 | 83.064 | 3.01 | 1.5182 | 59.0 |
| 17 | 63.350 | 3.64 | 1.7950 | 45.2 |
| 18 | −818.140 | | | |

FIG.23B

| Magnification | d0 (Object distance) | d18 (Image distance) |
|---|---|---|
| −0.6 × | 132.36 | 54.13 |
| −1.0 × | 93.75 | 77.29 |
| −1.6 × | 72.04 | 112.04 |

| Conditional expression | Values for the condition |
|---|---|
| Expression (1) | $\delta\theta 3 = 0.0263$ <br> $(\theta 3 = 1.243)$ |
| Expression (2) | $\delta\theta 6 = 0.0263$ <br> $(\theta 6 = 1.243)$ |
| Expression (3) | 0.135 |
| Expression (6) | −0.10 |
| Expression (7) | 1.09 |
| Expression (8) | 13.8 |

FIG.24

Magnification
−0.6X

Magnification
−1.0X

Magnification
−1.6X

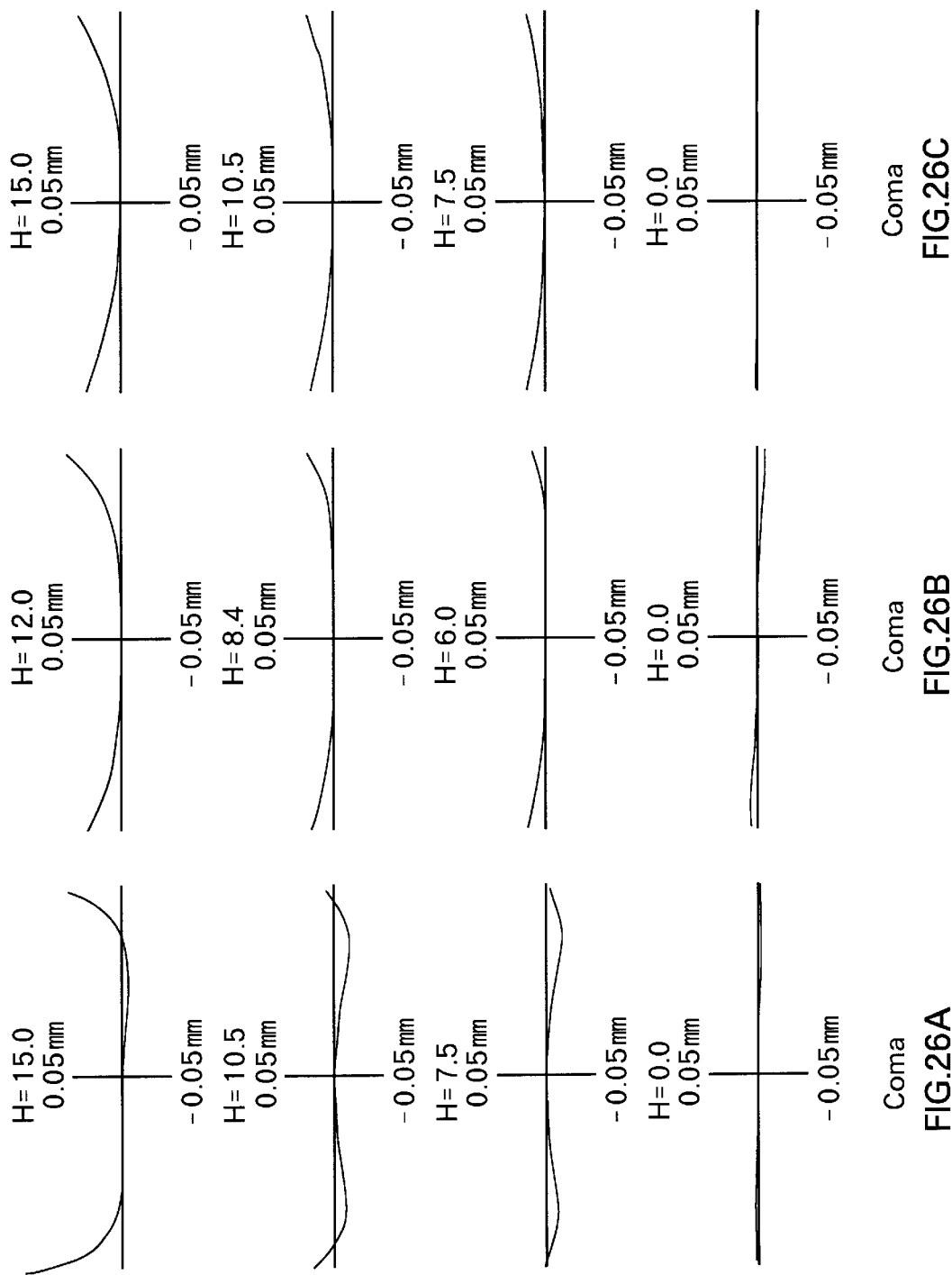

IMAGE CAPTURE LENS AND IMAGE CAPTURE APPARATUS

BACKGROUND OF THE INVENTION

1. Field of the Invention

The present invention relates to an image capture lens and an image capture apparatus which are used for reading various kinds of images.

2. Description of the Related Art

An image capture apparatus, in which an image of an original such as a negative film or positive film is formed on a solid state image sensor such as a charge-coupled device (CCD) serving as a light-receiving device through a image capture optical system, and then image information is read, has been developed. With the increase of high density in the light-receiving device, high resolution of an image capture lens employed in the optical system of the image capture apparatus is in demand in recent years. Particularly, with regard to the image capture lens which is utilized in the image capture apparatus in which color images are read with one CCD, for example, achromatization needs to be performed preferably in order that imaging points of images composed of each color: red (R), green (G) and blue (B) correspond to each other on the light-receiving surface of the CCD, and desirably resolution levels of each color on the device are maintained. Specifically, the image capture lens is required to exhibit imaging performance such that axial chromatic aberration and chromatic aberration of magnification of each RGB color are small, and images from the center to peripheries are formed on a plane substantially vertical to the optical axis. When the image capture lens has such imaging performance, high-contrast images with each RGB color can be obtained.

However, there exists a problem such that, if axial chromatic aberration is not corrected enough in the image capture lens, imaging points of each RGB color do not correspond to each other. Therefore, even though individual resolution of each RGB color is in high contrast, variations in contrast of each RGB color occur depending on the imaging point. To correct such variations in contrast, a mechanism which focuses each color individually or a method such that an image plane is shifted in accordance with the magnitude of chromatic aberration is necessary.

When 'f' and $\beta(\beta<0)$ represent focus length and imaging magnification of a lens, the magnitude of axial chromatic aberration $\Delta S$ is expressed by $\Delta S$ $(1-\beta)^2 * f$, which denotes that as the focal length f becomes longer or the absolute value $|\beta|$ of the imaging magnification becomes larger, the amount of axial chromatic aberration occurred increases. This is noticeable in a lens made of a material with no anomalous dispersion. In such a lens, axial chromatic aberration is not sufficiently corrected. Particularly, it is difficult to obtain high contrast simultaneously between each RGB color in a magnification range. Thus, when such high-level axial chromatic aberration is subjected to correct in the image capture lens, use of a lens material with high anomalous dispersion is effective. In that case, as the anomalous dispersion is larger, the effect of correction is larger. Further, as the refractive power is larger, the effect of correction is larger. However, if the refractive power is made too large, the magnitude of various kinds of aberrations becomes larger resulting in deterioration of image quality. Accordingly, when the material with large anomalous dispersion is used for the 'i'th lens element in the image capture lens, for example, desirably by giving a moderate value for $\Sigma\phi_i*\delta\theta_i$ which is the sum of the products of the refractive power $\phi_1$ ($\phi_i=1/f_i$) and the anomalous dispersion $\delta\theta_i$ of the lens elements made of the material, axial chromatic aberration is made smaller and other aberrations are preferably corrected.

Although many image capture lenses in which achromatization is utilized have been proposed heretofore, magnification used in most of the conventional capture lenses is reducing imaging magnification such as −0.1× to −0.2×, thus large axial chromatic aberration which occurs in magnifying images is difficult to correct. Therefore, the conventional image capture lenses are not adequate for capturing images with scaling them up or down crossing over the magnification of the actual size, for example. For example, if the conventional image capture lenses are used in the magnification range of −0.6× to −1.6×, it is difficult to form preferable images by scaling them up in particular.

SUMMARY OF THE INVENTION

The present invention has been achieved in view of the above problems. It is an object of the invention to provide an image capture lens and an image capture apparatus in which various kinds of aberrations are corrected and optical performance suitable for capturing images is obtained.

In the image capture lens of the first aspect of the invention, successively from an object side provided are a first lens group including a negative meniscus lens; a second lens group including a positive lens directing its convex to the object side; a third lens group including a first cemented lens composed of a bi-convex positive lens and a bi-concave negative lens, the first cemented lens having positive refractive power and directing its convex to the object side; a fourth lens group including a second cemented lens composed of a bi-concave negative lens and a bi-convex positive lens, the second cemented lens having negative refractive power and directing its convex to an image side; a fifth lens group including a positive lens directing its convex to the image side; and a sixth lens group including a negative lens directing its concave to the object side.

The image capture apparatus of the first aspect of the invention reads images through the image capture lens of the first aspect of the invention.

In the image capture lens of the first aspect of the invention, desirably expressions $65<\nu_3$, $0.015<\delta\theta_3$, $65<\nu_6$ and $0.015<\delta\theta_6$ are satisfied when the $\nu_3$ and the $\delta\theta_3$ represent Abbe number for a wavelength of d-line and anomalous dispersion of the positive lens in the third lens group, and the $\nu_6$ and the $\delta\theta_6$ represent Abbe number for the wavelength of d-line and anomalous dispersion of the positive lens in the fourth lens group.

In the image capture lens of the first aspect of the invention, desirably expressions $0.09<(\phi_3*\delta\theta_3+\phi_6*\delta\theta_6)/\phi_T<0.15$, $0.75<(n_3*\nu_4)/(n_4*\nu_3)<1.10$ and $-13.0<\phi_T^2/(\phi_{3,4}*\phi_{5,6})<-0.3$ are satisfied when the $\phi_3$ and the $\delta\theta_3$ represent refractive power and anomalous dispersion of the positive lens in the third lens group, respectively, the $\phi_6$ and the $\delta\theta_6$ represent refractive power and anomalous dispersion of the positive lens in the fourth lens group, respectively, the $\nu_3$ and the $n_3$ represent Abbe number and refractive index for the wavelength of d-line of the positive lens in the third lens group, respectively, the $\nu_4$ and the $n_4$ represent Abbe number and refractive index for the wavelength of d-line of the negative lens in the third lens group, respectively, and the $\phi_{3,4}$ represents refractive power of the entire cemented lens in the third lens group, $\phi_{5,6}$ represents the refractive power of the entire cemented lens in the fourth lens group and the $\phi_T$ represents refractive power of an entire lens system including all the lens groups.

In the image capture lens of the second aspect of the invention, successively from an object side provided are a first lens group including a negative meniscus lens; a second lens group including a positive lens directing its convex to the object side; a third lens group including a first cemented lens composed of a bi-convex positive lens and a bi-concave negative lens, the first cemented lens having positive refractive power and directing its convex to an object side; a fourth lens group including a second cemented lens composed of a bi-concave negative lens and a bi-convex positive lens, the second cemented lens directing its convex to the image side; a fifth lens group including a positive lens directing its convex to the image side; a sixth lens group including a negative lens directing a surface thereof to the object side, a radius of the surface being smaller than that of an opposite surface; and a seventh lens group including a negative meniscus lens and a positive lens. In the image capture lens of the second aspect of the invention, a third cemented lens may be composed of the negative meniscus lens and the positive lens in the seventh lens group, the third cemented lens directing its convex to the object side.

The image capture apparatus of the second aspect of the invention reads images through the image capture lens of the second aspect of the invention.

In the image capture lens of the second aspect of the invention, expressions $65<v_3$, $0.015<\delta\theta_3$, $65<v_6$ and $0.015<\delta\theta_6$ are satisfied when the $v_3$ and the $\delta\theta_3$ represent Abbe number for the wavelength of d-line and a ! anomalous dispersion of the positive lens in the third lens group, respectively and the $v_6$ and the $\delta\theta_6$ represent Abbe number for the wavelength of d-line and anomalous dispersion of the positive lens in the fourth lens group, respectively.

In the image capture lens of the second aspect of the invention, $0.09<(\phi_3*\delta\theta_3+\phi_6*\delta\theta_6)/\phi_T<0.15$ is satisfied when the $\phi_3$ and the $\delta\theta_3$ represent refractive power and anomalous dispersion of the positive lens in the third lens group, respectively, the $\phi_6$ and the $\delta\theta_6$ represent refractive power and anomalous dispersion of the positive lens in the fourth lens group, respectively and the $\phi_T$ represents refractive power in an entire lens system including all the lens groups, and $-0.2<r_{16}/r_{18}<1.2$, $0.35<\phi_T*r_{17}<1.2$ and $13<v_9-v_{10}$ are satisfied when the $v_9$ and the $v_{10}$ represent Abbe number for the wavelength of d-line of the negative meniscus lens and the positive lens in the seventh lens group, respectively and the $r_{16}$, the $r_{17}$ and the $r_{18}$ represent radius of curvature of lens surfaces of the seventh lens group from the object side.

The image capture lens of the first and second aspects of the invention is constituted as described above. Thus, various kinds of aberrations are preferably corrected so that imaging performance suitable for capturing images is obtained. Further, in the image capture apparatus of the first and second aspects of the invention, high-quality images obtained through the image capture lens of the first and the second aspects of the invention are read.

Other and further objects, features and advantages of the invention will appear more fully from the following description.

BRIEF DESCRIPTION OF THE DRAWINGS

FIGS. 3A and 3B are tables of a first example (Example 1-1) with specific numeric values of the image capture lens according to the first embodiment of the invention;

FIG. 4 is a table containing various conditions for the image capture lens of Example 1-1 as in FIGS. 3A and 3B;

FIGS. 5A to 5C are aberration charts of spherical aberration, astigmatism, distortion and chromatic aberration of magnification at each magnification with regard to the image capture lens of Example 1-1 as in FIGS. 3A and 3B;

FIGS. 6A to 6C are aberration charts of coma at each magnification with regard to the image capture lens of Example 1-1 as in FIGS. 3A and 3B;

FIGS. 8A and 8B are tables of Example 1-2 with specific numeric values of the image capture lens according to the first embodiment of the invention;

FIG. 9 is a table containing various conditions for the image capture lens of Example 1-2 as in FIGS. 8A and 8B;

FIGS. 13A and 13B are tables of Example 1-3 with specific numeric values of the image capture lens according to the first embodiment of the invention;

FIG. 14 is a table containing various conditions for the image capture lens of Example 1-3 as in FIGS. 13A and 13B;

FIGS. 15A to 15C are aberration charts of spherical aberration, astigmatism, distortion and chromatic aberration of magnification at each magnification with regard to the image capture lens of Example 1-3 as in FIGS. 13A and 13B;

FIGS. 16A to 16C are aberration charts of coma at each magnification with regard to the image capture lens of Example 1-3 as in FIGS. 13A and 13B;

FIGS. 18A and 18B are tables of Example 2-1 with specific numeric values of the image capture lens according to the second embodiment of the invention;

FIG. 19 is a table containing various conditions for the image capture lens of Example 2-1 as in FIGS. 18A and 18B;

FIGS. 23A and 23B are tables of Example 2-2 with specific numeric values of the image capture lens according to the second embodiment of the invention;

FIG. 24 is a table containing various conditions for the image capture lens of Example 2-2 as in FIGS. 23A and 23B;

FIGS. 26A to 26C are aberration charts of coma at each magnification with regard to the image capture lens of Example 2-2 as in FIGS. 23A and 23B.

DETAILED DESCRIPTION OF THE PREFERRED EMBODIMENTS

Embodiments of the present invention will be described below in detail with reference to the accompanying drawings.

First Embodiment

Figure 1:
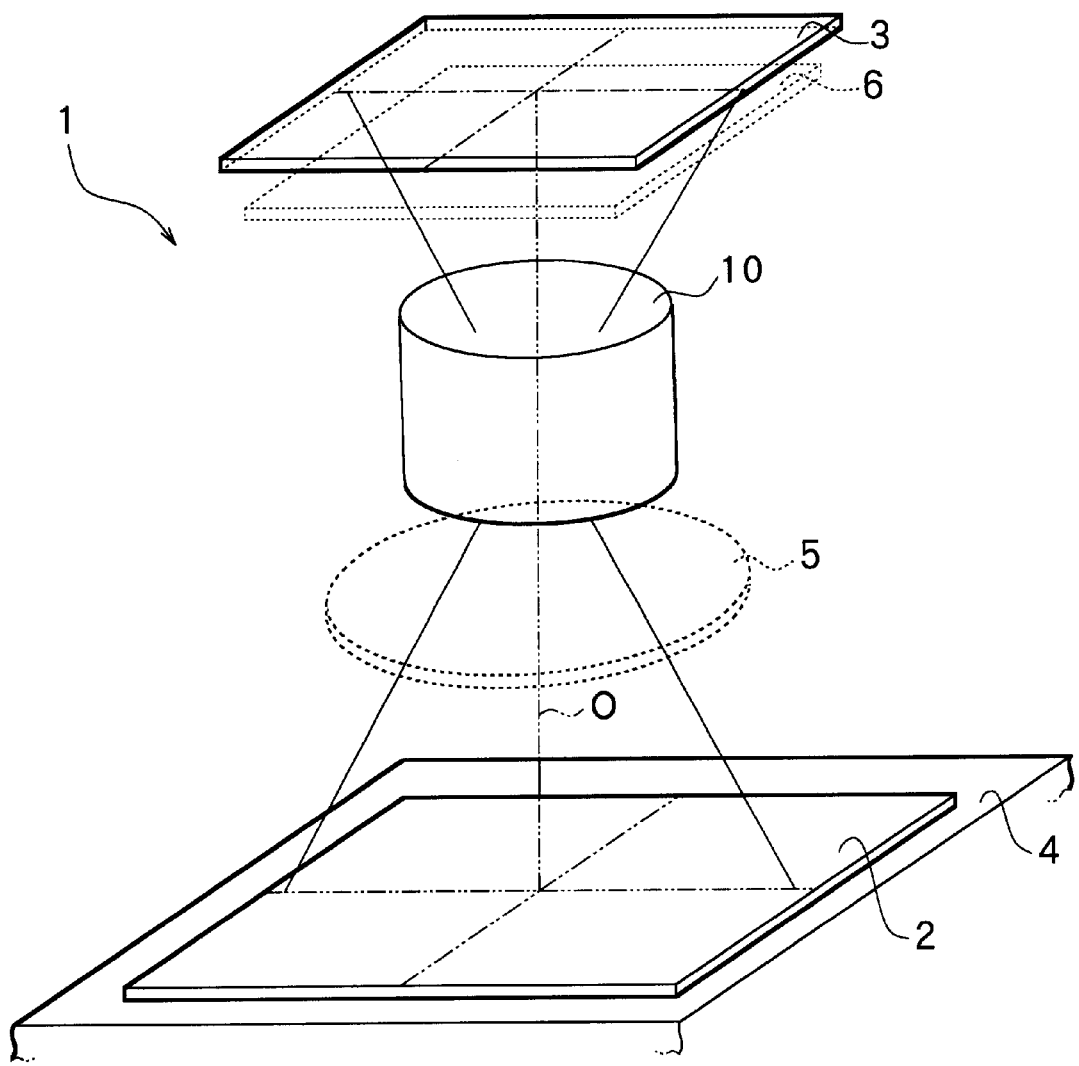
FIG. 1 is a diagram showing the configuration of an image capture apparatus according to a first embodiment of the invention.

An image capture apparatus 1 according to a first embodiment of the present invention illustrated in FIG. 1 comprises a subject stage 2 for mounting an original 4 such as a negative film or a positive film, for example, an imaging device 3 for picking up an image of the original 4 and an image capture lens 10 for forming the image of the original 4 on an imaging surface of the imaging device 3. The imaging device 3 is constituted of a charge-coupled device (CCD) or the like. In the image capture apparatus 1, between the original 4 and the image capture lens 10, an optical element 5 such as a glass or a filter for holding down the original 4 on the subject table 2 as necessary. Further, between the image capture lens 10 and the imaging device 3, an optical element 6 such as a cover glass for protecting the imaging device 3 or a filter is provided as necessary. In the image capture apparatus 1, the image of the original 4 obtained through the image capture lens 10 is formed and read by the imaging device 3.

Figure 2:
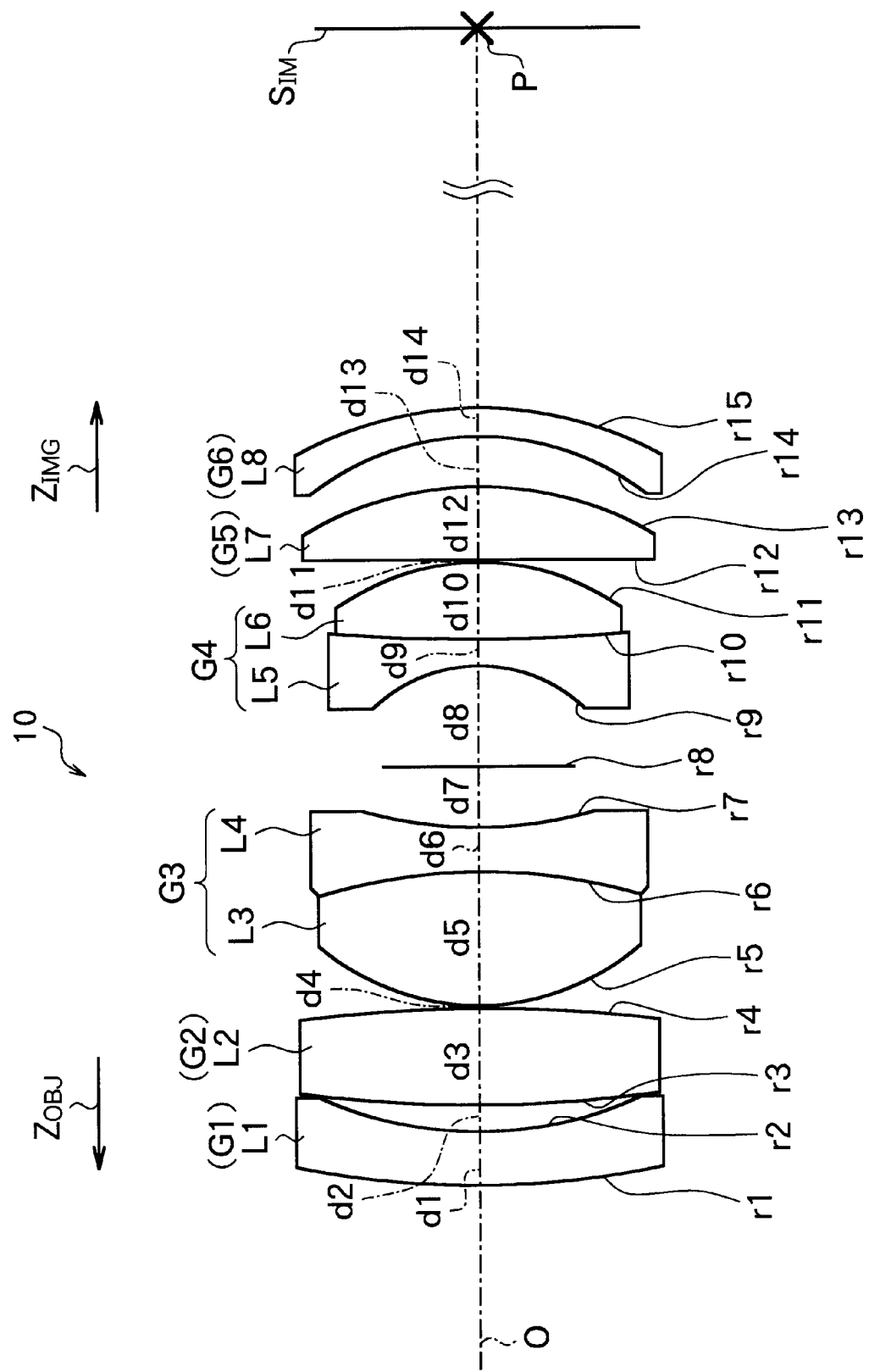
FIG. 2 is a cross sectional view showing the structure of the image capture lens according to the first embodiment of the invention.

FIG. 2 is a schematic diagram of the configuration of the image capture lens 10 according to the embodiment showing each lens element in cross section within a single plane including an optical axis O. In FIG. 2, the side represented by '$Z_{OBJ}$' denotes an object side, i.e., the side where the original 4 is disposed and the image thereof to be read is provided, whereas the side represented by '$Z_{IMG}$' denotes an image side, i.e., the side where the image on the object side is formed. On an imaging surface $S_{IM}$ of the image capture lens 10, the imaging surface of the imaging device 3 is disposed. In FIG. 2, 'P' represents the position of the center of image formation of the image capture lens 10; '$r_i$' represents the radius of curvature of the lens surface of the ith lens from the object side; and '$d_i$' represents the surface separation between the ith lens surface and the [i+1]th lens surface from the object side on the optical axis, where 'i' is integer. The line represented by '$r8$' is a stop of the lens system in FIG. 2.

In the image capture lens 10, successively from the object side provided are a first lens group G1 including a negative meniscus lens L1, a second lens group G2 including a positive lens L2 directing its convex to the object side, a third lens group G3 including a cemented lens which is composed of a bi-convex positive lens L3 and a bi-concave negative lens L4, the cemented lens having positive refractive power with its convex facing the object side, a fourth lens group G4 including a cemented lens which is composed of a bi-concave negative lens L5 and a bi-convex positive lens L6, the cemented lens having negative refractive power with its convex facing the image side, a fifth lens group G5 including a positive lens L7 directing its convex to the image side and a sixth lens group G6 including a negative lens L8 directing its concave to the objective side.

As shown in FIG. 2, the convex of the negative meniscus lens L1 in the first lens group G1 faces the object side, for example. Both of the surfaces of the positive lens L2 in the second lens group G2 are convex, for example. Both of the surfaces of the positive lens L7 in the fifth lens group G5 are convex, for example. The negative lens L8 in the sixth lens group G6 has a meniscus shape directing its concave to the object side. However, shapes of the lens elements are not limited to those illustrated in FIG. 2. For example, the positive lens L2 in the second lens group G2 may have a meniscus shape directing its convex to the object side as shown in Example 1-2 to be described later instead of having a bi-convex shape as in the embodiment.

In the image capture lens 10, when '$v_3$' and '$\delta\theta 3$' are Abbe number for a wavelength of d-line (wavelength $\lambda_d$=587.6 nm) and anomalous dispersion the positive lens L3 in the third lens group G3, respectively and '$v_6$' and '$\delta\theta 6$' are Abbe number for the wavelength of d-line and anomalous dispersion of the positive lens L6 in the fourth lens group G4, respectively, preferably the following conditional expressions (1) and (2) are satisfied. More preferably, the following conditional expressions (1-1) and (2-1) are satisfied in the image capture lens 10.

$$65 < v_3,\ 0.015 < \delta\theta 3 \tag{1}$$

$$65 < v_6,\ 0.015 < \delta\theta 6 \tag{2}$$

$$65 < v_3,\ 0.02 < \delta\theta 3 \tag{1-1}$$

$$65 < v_6,\ 0.02 < \delta\theta 6 \tag{2-1}$$

In the image capture lens 10, when '$\phi 3$' and '$\phi 6$' are the refractive power of the positive lens L3 in the third lens group G3 and the positive lens L6 in the fourth lens group G4, respectively and '$\phi T$' is the refractive power of the entire lens system including all lens groups, preferably the following conditional expression (3) is satisfied.

$$0.09 < (\phi 3 * \delta\theta 3 + \phi 6 * \delta\theta 6)/\phi T < 0.15 \tag{3}$$

Prior to the description of the action brought by the conditional expressions (1) to (3), the anomalous dispersion is set forth herein below. Generally when a v versus θ graph is drawn taking the Abbe number v as the horizontal-axis and the relative partial dispersion θ as the vertical axis, for example, it is well known that most of glass materials are distributed along a predetermined reference line on the graph. As a glass material is distributed in a position farther from the predetermined reference line, the glass material has larger anomalous dispersion.

For example, glass materials K7 and F2 from Schott are selected as a reference supposing K7 and F2 are normal optical glasses, and points of K7 and F2 are plotted on a $v_d$ (Abbe number at the d-line) versus $\theta_{g,d}$ (relative partial dispersion at the g-d line) graph, thus a reference line L is formed. The reference line L is defined by the following expression (B).

$$\theta_L = 1.365 - 0.00208 * v_d \tag{B}$$

Relative partial dispersion $\theta_{g,d}$ of a given glass material minus $\theta_L$ obtained by the above expression (B) is equal to a deviation of the relative partial dispersion, i.e., a value $\delta\theta_{g,d}$ of anomalous dispersion. In the embodiment, the anomalous dispersion is defined by the following expression (A) and this expression is used as a standard for anomalous dispersion.

$$\delta\theta_{g,d} = \theta_{g,d} - (1.365 - 0.00208 * v_d) \tag{A}$$

When $n_g$, $n_d$, $n_F$ and $n_c$ represent the refractive index at g-line, d-line, F-line and C-line, respectively, the relative partial dispersion $\delta\theta_{g,d}$ at g-d-line is defined as $$\theta_{g,d}=(n_g-n_d)/(n_F-n_C).$$

The wavelengths of g-line, F-line and C-line are approximately 435.8 nm, 486.1 nm and 656.3 nm, respectively.

Next, the conditional expressions (1) to (3) will now be described. These expressions (1) to (3) provide conditions such that a glass material with large anomalous dispersion is put to use for the positive lenses L3 and L6 of the cemented lenses in the third lens group G3 and the fourth lens group G4 so as to have moderate refractive power, thus chromatic aberration is preferably corrected in particular. The conditional expressions (1) and (2) define conditions such that a glass material having anomalous dispersion with a deviation in a positive direction relative to the reference line L expressed by the expression (B) is put to use for the positive lenses L3 and L6. The refractive power of the positive lenses L3 and L6 is distributed in balance so as to satisfy the conditional expressions (1), (2) and (3). Thus, particularly high-order axial chromatic aberration which occurs on the magnification side is corrected and further various kinds of aberrations such as spherical aberration or coma are prevented from increasing.

If the lenses exceed the restriction of the conditional expressions (1) and (2), the refractive power becomes too large and negative spherical aberration and coma flare increase caused by correcting high-order axial chromatic aberration which occurs on the magnification side. Thus, it is difficult to attain high resolution. If the lenses exceed the lower limit of the conditional expression (3), the axial chromatic aberration is not sufficiently corrected. Accordingly, it is difficult to achieve high resolution with all RGB color. If the lenses exceed the upper limit of the conditional expression (3), the axial chromatic aberration is corrected preferably but the radius of curvature of each lens becomes smaller. Thus, when an attempt to obtain a bright lens is made, spherical aberration in a negative direction becomes larger Thus, coma flare and curvature of field occur even off the optical axis, resulting in failing to obtain preferable performance.

In the image capture lens 10, when '$v_3$' and '$n_3$' denote the Abbe number and refractive index at d-line of the positive lens L3 in the third lens group G3, respectively; '$v_4$' and '$n_4$' denote the Abbe number and refractive index at d-line of the positive lens L4 in the third lens group G3, respectively; '$\phi_{3,4}$' denotes the refractive power of the entire cemented lens in the third lens group G3; and '$\phi_{5,6}$' denotes the refractive power of the entire cemented lens in the fourth lens group G4, preferably the following conditional expressions (4) and (5) are satisfied.

$$0.75<(n3^*v4)/(n4^*v3)<1.10 \quad (4)$$

$$-13.0<\phi T^2/(\phi_{3,4}{}^*\phi_{5,6})<-0.3 \quad (5)$$

The conditional expression (4) provides a condition on correction of chromatic aberration and curvature of field. By selecting the glass material of the lenses L3 and L4 so as to satisfy the condition, obtained is a combination of the lenses L3 and L4 with which chromatic aberration is preferably corrected and even when the lenses have large refractive power, the curvature of field is corrected preferably.

The conditional expression (5) provides a condition for each of the third lens group G3 and the fourth lens group G4 including the cemented lens to have positive or negative refractive power with moderate intensity, respectively.

When the glass material of the lenses L3 and L4 is selected so as to satisfy the conditional expression (4), the power of the convex lens in the entire third lens group G3 increases, resulting in increasing negative spherical aberration. To correct this increased negative spherical aberration, providing the action of the concave lens as appropriate to the fourth lens group G4 enables the spherical aberration to be preferably corrected. If each refractive power of the cemented lenses in the third lens group G3 and the fourth lens group G4 becomes too large or small exceeding the range of the conditional expression (5), the balance in correction between a various kinds of aberrations is lost, thereby increasing spherical aberration flare or coma flare in a part where field angle is large in particular.

The image capture lens 10 of the embodiment constituted as described above exhibits optical performance such that color images of an original such as a negative film or positive film are captured by scaling them up or down crossing over the magnification of the actual size, for example. Scaling is performed in a manner that the entire lens system is shifted in accordance with the magnification, thereby changing object distance or image distance, for example.

Generally in the image capture lens, in order to correct axial chromatic aberration at magnifications close to that of the actual size, particularly, at larger magnifications, a lens element is made of a material having high anomalous dispersion and the refractive power thereof is made large so that the axial chromatic aberration is greatly corrected. However, when the refractive power is made large, the radius of curvature of the lens surface becomes small. When seeking to obtain bright optical performance, various kinds of aberrations such as spherical aberration, coma flare or curvature of field occur in the lens surface. Accordingly, preferable performance over a wide magnification range cannot be obtained. Therefore, in the image capture lens 10 of the embodiment, auxiliary lens elements such as the lens L8 with negative power are added to the Gauss lens system. Thus, with the use of the lens material having high anomalous dispersion, each lens has moderate refractive power, so that bright optical performance in which various aberrations are preferably corrected over a wide magnification range, e.g., $-0.6\times$ to $-1.6\times$ is obtained.

As has been described, in the image capture lens 10 according to the embodiment, various kinds of aberrations are corrected and optical performance suitable for capturing images is obtained. Further, in the image capture apparatus 1 according to the embodiment, images suitable for capturing images are obtained through the image capture lens 10, thus high-quality image capturing is performed.

EXAMPLE 1-1

Next, a first example (Example 1-1)of the image capture lens 10 according to the embodiment will now be described with reference to FIGS. 3A to 6C.

FIGS. 3A and 3B are tables of an image capture lens 10-1 using specific values according to Example 1-1. In FIG. 3A, a surface number Si denotes the sequence of lens surfaces from the object side. With regard to the refractive index and the Abbe number, values at d-line (wavelength $\lambda$=587.6 nm) are shown. The '$r_i$' represents radius of curvature of the 'i'th lens surface from the object side similar to the '$r_i$' shown in FIG. 2. Similar to the '$d_i$' as in FIG. 2, the '$d_i$' represents surface separation between the 'i'th lens surface $S_i$ and the [i+1]th lens surface $S_i$+1 from the object side on the optical axis. The radius of curvature '$r_i$' and the surface separation '$d_i$' are expressed in millimeter (mm).

FIG. 3B shows values for the object distance and the image distance at three typical imaging magnification (−0.6×, −1.0× and −1.6×) of the image capture lens 10-1. The object distance d0 denotes a distance from an object point to a first lens surface S1 on the optical axis, while the image distance d15 denotes a distance from a last lens surface S15 to an image point on the optical axis.

FIG. 4 shows values corresponding to the conditional expressions (1) to (5). With reference to FIG. 3A, in the image capture lens 10-1 according to Example 1-1, with respect to the positive lens L3 in the third lens Group G3, the Abbe number $\nu_3$ at d-line is 71.3; the relative partial dispersion $\theta_3$ is 1.243; and the anomalous dispersion $\delta_3$ is 0.0263, which satisfies the conditional expression (1). With respect to the positive lens L6 in the fourth lens group G4, the Abbe number $\nu_6$ at d-line is 71.3; the relative partial dispersion $\theta_6$ is 1.243; and the anomalous dispersion $\delta_6$ is 0.0263, which satisfies the conditional expression (2).

In the image capture lens 10-1, the value for $\phi_3 * \delta\theta_3 + \phi_6 * \delta\theta_6$ is 0.122, which satisfies the conditional expression (3). The value for $(n_3 * \nu_4)/(n_4 * \nu_3)$ is 0.96, which satisfies the conditional expression (4). The value for $\phi T^2/(\phi_{3,4} * \phi_{5,6})$ is "0.49, which satisfies the conditional expression (5).

FIGS. 5A to 5C are aberration charts of spherical aberration, astigmatism, distortion and chromatic aberration of magnification at each magnification in the image capture lens 10-1. FIGS. 5A, 5B and 5C show aberrations at imaging magnification of −0.6×, −1.0× and −1.6×, respectively. FIGS. 5A to 5C also show effective F number (Fno) at each magnification. FIGS. 6A to 6C show coma at each imaging magnification in the image capture lens 10-1. FIGS. 6A, 6B and 6C show coma at magnification of −0.6×, −1.0× and −1.6×, respectively. In these aberration charts, 'H' represents image height and 'R', 'G' and 'B' represent red, green and blue, respectively. In these aberration charts, C-line, d-line and F-line represent R (red), G (green) and B (blue), respectively. In the aberration charts showing astigmatism, 'S' represents the sagittal image surface and 'T' represents the meridional (tangential) image surface. Coma of green is shown in the aberration charts of coma.

As apparent from these aberration charts and values for the conditions as in FIG. 4, in the image capture lens 10-1 of Example 1-1, various kinds of aberrations are preferably corrected all the area from the center to peripheries of the image at each magnification, thereby exhibiting preferable optical performance suitable for capturing images.

EXAMPLE 1-2

With reference to FIGS. 7 to 11C, a second example (Example 1-2) of the image capture lens 10 of the embodiment will be described herein below.

Figure 7:
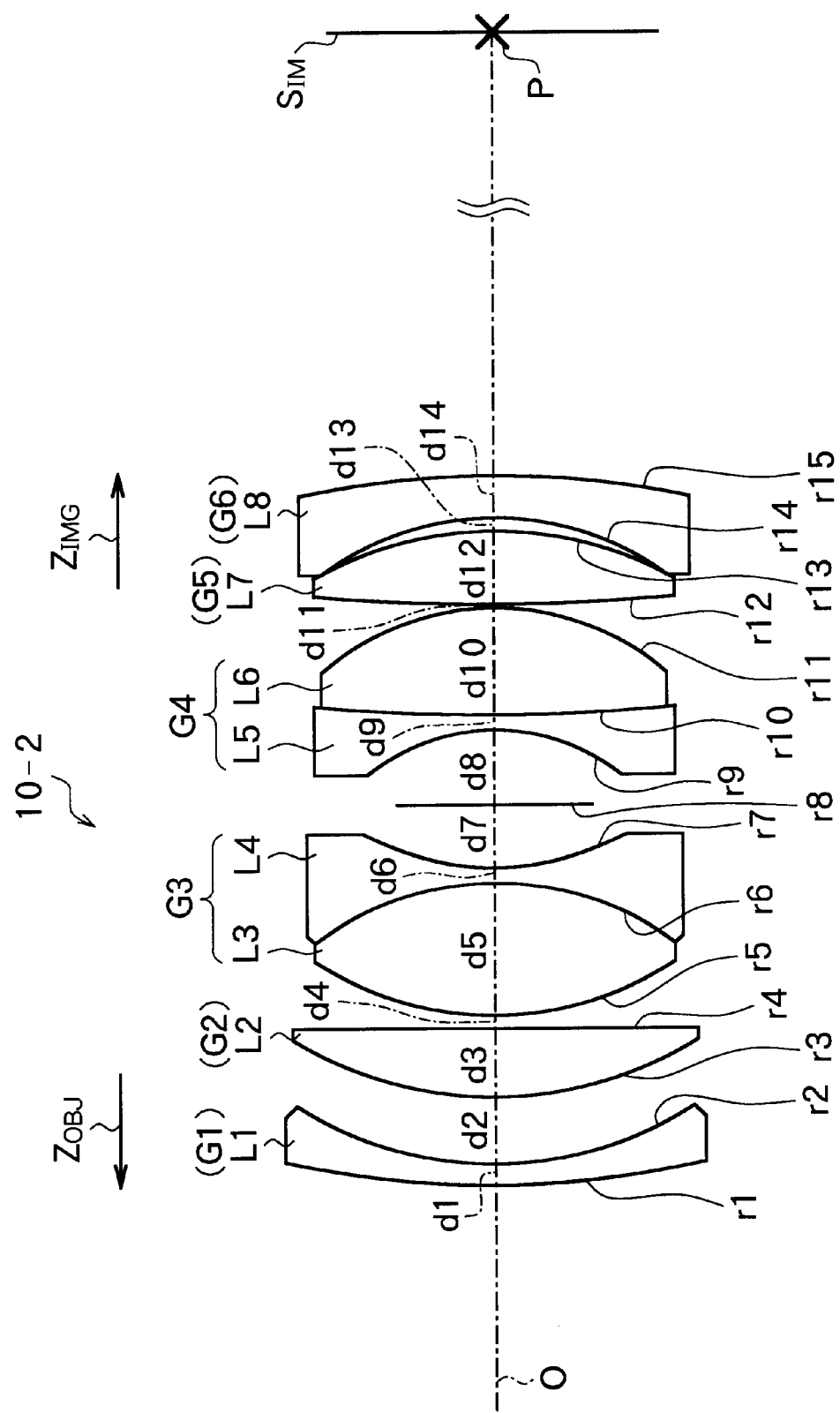
FIG. 7 is a cross sectional view showing the structure of the image capture apparatus according to a second example (Example 1-2)of the first embodiment of the invention.
Figure 10:
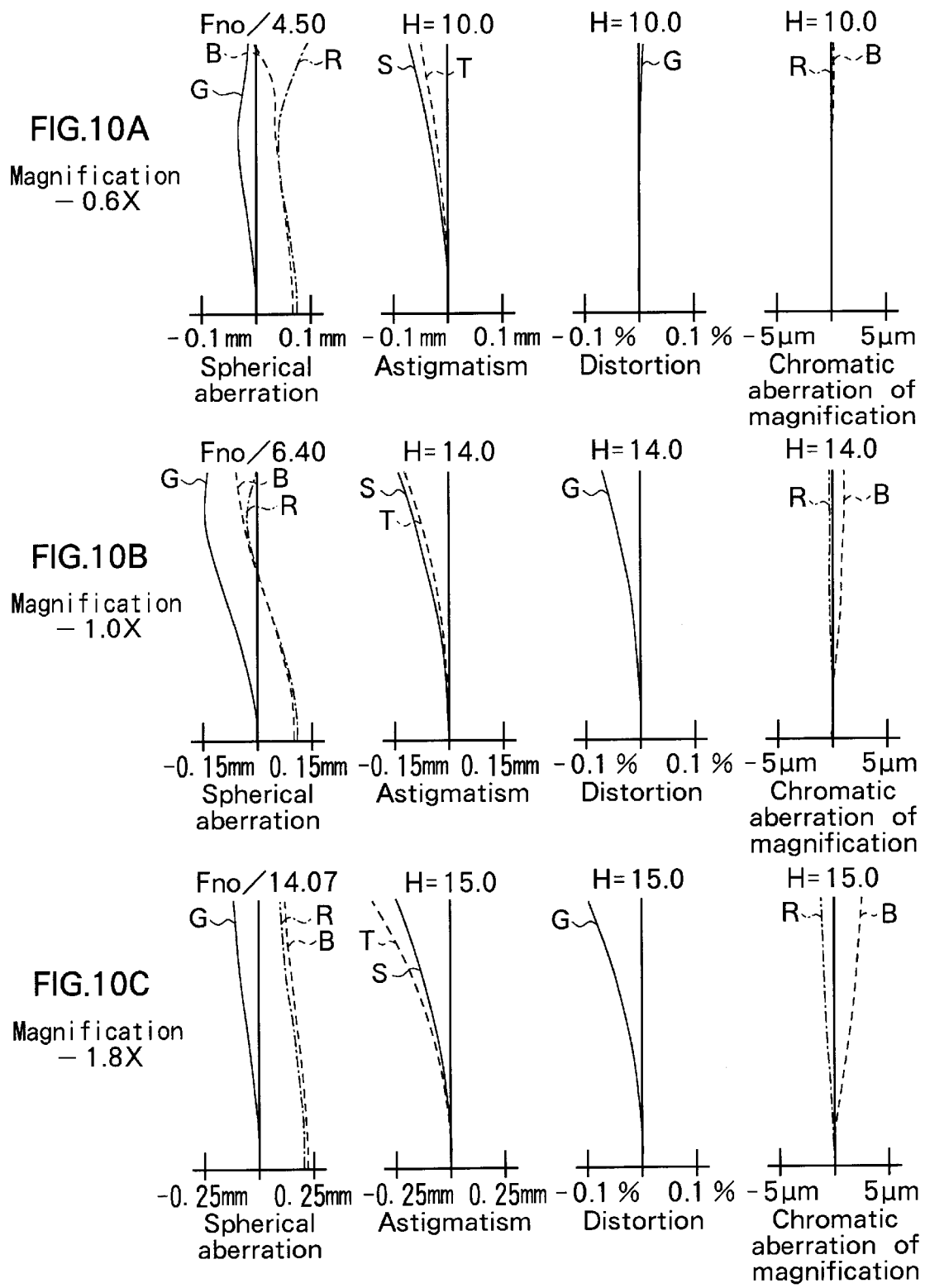
FIGS. 10A to 10C are aberration charts of spherical aberration, astigmatism, distortion and chromatic aberration of magnification at each magnification with regard to the image capture lens of Example 1-2 as in FIGS. 8A and 8B.
Figure 11:
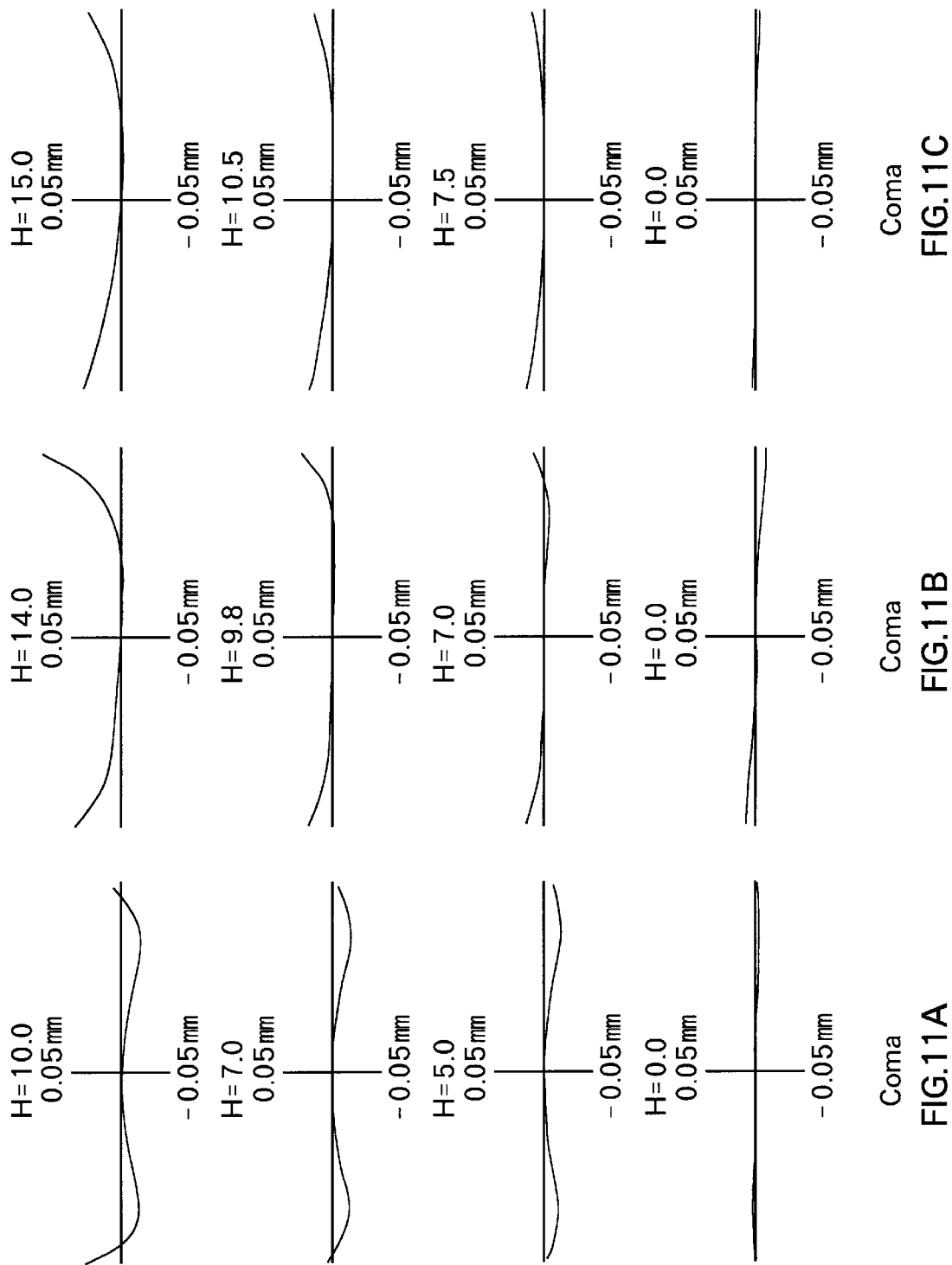
FIGS. 11A to 11C are aberration charts of coma at each magnification with regard to the image capture lens of Example 1-2 as in FIGS. 8A and 8B.

FIGS. 8A and 8B are tables of an image capture lens 10-2 using specific values according to Example 1-2. FIG. 7 is illustrated corresponding to the values for elements of the image capture lens 10-2 as in FIGS. 8A and 8B. Symbols in FIG. 7 and FIGS. 8A and 8B represent the same as those in FIG. 2 and FIGS. 3A and 3B.

FIG. 8B shows values for the object distance and the image distance at three typical imaging magnification (−0.6×, −1.0× and −1.8×) of the image capture lens 10-2. The object distance d0 denotes a distance from an object point to a first lens surface S1 on the optical axis, while the image distance d15 denotes a distance from a last lens surface S 15 to an image point on the optical axis.

FIG. 9 shows values corresponding to the conditional expressions (1) to (5). With reference to FIG. 8A, in the image capture lens 10-2 according to Example 1-2, with respect to the positive lens L3 in the third lens Group G3, the Abbe number $\nu_3$ at d-line is 71.3; the relative partial dispersion $\theta_3$ is 1.243; and the anomalous dispersion $\delta_3$ is 0.0263, which satisfies the conditional expression (1). With respect to the positive lens L6 in the fourth lens group G4, the Abbe number $\nu_6$ at d-line is 71.3; the relative partial dispersion $\theta_6$ is 1.243; and the anomalous dispersion $\delta_6$ is 0.0263, which satisfies the conditional expression (2).

In the image capture lens 10-2, the value for $\phi_3 * \delta\theta_3 + \phi_6 * \delta\theta_6$ is 0.119, which satisfies the conditional expression (3). The value for $(n_3 * \nu_4)/(n_4 * \nu_3)$ is 0.86, which satisfies the conditional expression (4). The value for $\phi_T^2/(\phi_{3,4} * \phi_{5,6})$ is −5.29, which satisfies the conditional expression (5).

FIGS. 10A to 10C are aberration charts of spherical aberration, astigmatism, distortion and chromatic aberration of magnification at each imaging magnification in the image capture lens 10-2. FIGS. 10A, 10B and 10C show aberrations at imaging magnification of −0.6×, −1.0× and −1.8×, respectively. FIGS. 10A to 10C also show effective F number (Fno) at each imaging magnification. FIGS. 11A to 11C show coma at each magnification in the image capture lens 10-2. FIGS. 11A, 11B and 11C show coma at magnification of −0.6×, −1.0× and −1.8×, respectively. Symbols in these aberration charts represent the same as those in FIGS. 5A to 5C and 6A to 6C.

As apparent from these aberration charts and values for the conditions as in FIG. 9, in the image capture lens 10-2 of Example 1-2, various kinds of aberrations are preferably corrected all the area from the center to peripheries of the image at each magnification, thereby exhibiting preferable optical performance suitable for capturing images.

EXAMPLE 1-3

With reference to FIGS. 12 to 16C, a third example (Example 1-3) of the image capture lens 10 of the embodiment will be described herein below.

Figure 12:
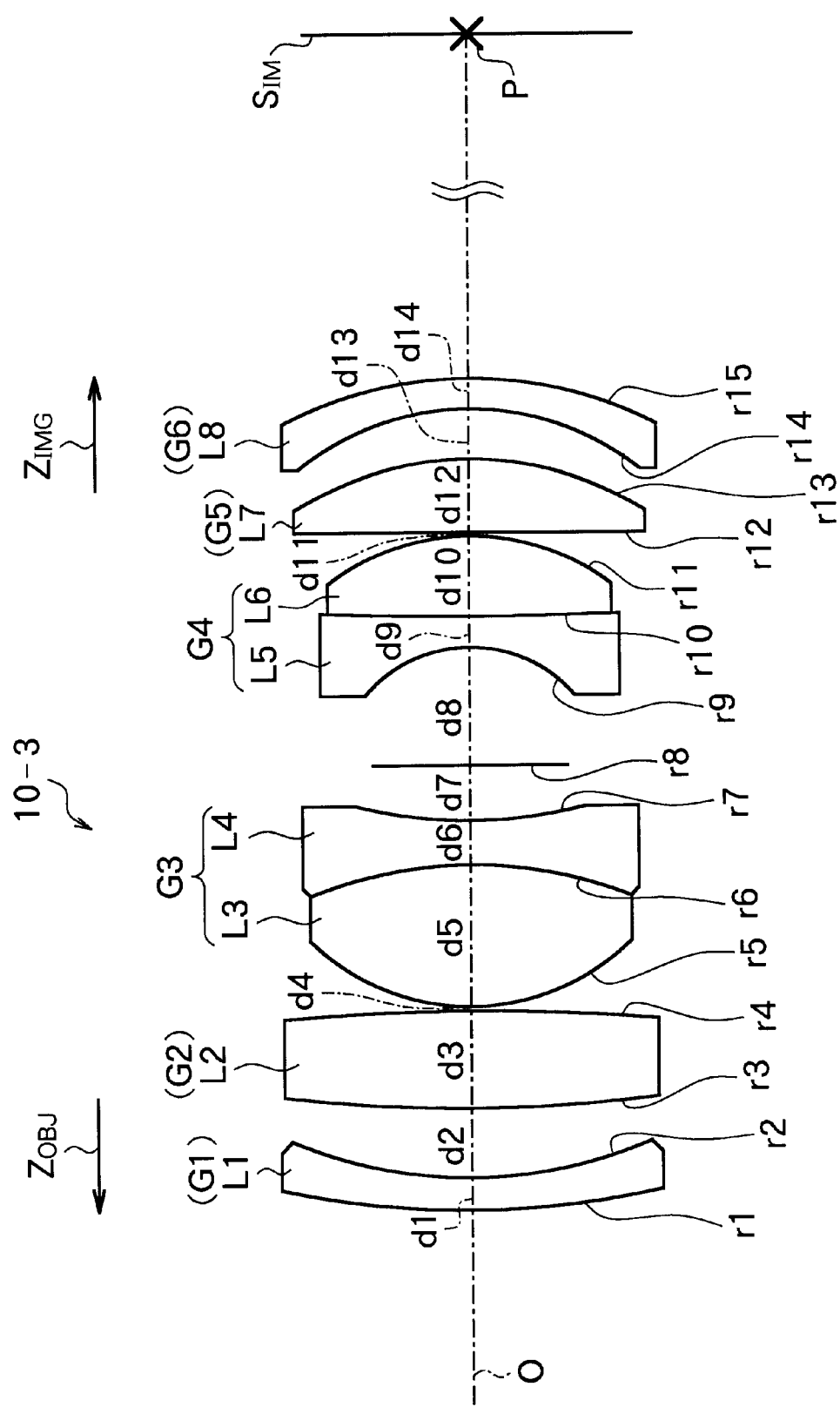
FIG. 12 is a cross sectional view showing the structure of the image capture lens according to a third example (Example 1-3) of the first embodiment of the invention.

FIGS. 13A and 13B are tables of an image capture lens 10-3 using specific values according to Example 1-3. FIG. 12 is illustrated corresponding to the values for elements of the image capture lens 10-3 of the Example 1-3 as in FIGS. 13A and 13B. Symbols in FIG. 12 and FIGS. 13A and 13B represent the same as those in FIG. 2 and FIGS. 3A and 3B.

FIG. 13B shows values for the object distance and the image distance at three typical imaging magnification (−0.6×,−1.0× and −1.6×) of the image capture lens 10-3. The object distance d0 denotes a distance from an object point to a first lens surface S1 on the optical axis, while the image distance d15 denotes a distance from a last lens surface S15 to an image point on the optical axis.

FIG. 14 shows values corresponding to the conditional expressions (1) to (5). With reference to FIG. 13A, in the image capture lens 10-3 according to Example 1-3, with respect to the positive lens L3 in the third lens group G3, the Abbe number $\nu_3$ at d-line is 81.6; the relative partial dispersion $\theta_3$ is 1.232; and the anomalous dispersion $\delta_3$ is 0.0367, which satisfies the conditional expression (1). With respect to the positive lens L6 in the fourth lens group G4, the Abbe number $\nu_6$ at d-line is 71.3; the relative partial dispersion $\theta_6$ is 1.234; and the anomalous dispersion $\delta_6$ is 0.263, which satisfies the conditional expression (2).

In the image capture lens 10-3, the value for $\phi_3 * \delta\theta_3 + *\phi_6$ is 0.146, which satisfies the conditional expression (3). The value for $(n_3 * \nu_4)/(n_4 * \nu_3)$ is 0.80, which satisfies the conditional expression (4). The value for $\phi_T^2/(\phi_{3,4} * \phi_{5,6})$ is −0.51, which satisfies the conditional expression (5).

FIGS. 15A to 15C are aberration charts of spherical aberration, astigmatism, distortion and chromatic aberration of magnification at each imaging magnification in the image capture lens 10-3. FIGS. 15A, 15B and 15C show aberrations at imaging magnification of –0.6×, –1.0× and –1.6×, respectively. FIGS. 15A to 15C also show effective F number (Fno) at each magnification. FIGS. 16A to 16C show coma at each imaging magnification in the image capture lens 10-3. FIGS. 16A, 16B and 16C show coma at magnification of –0.6×, –1.0× and –1.6×, respectively. Symbols in these aberration charts represent the same as those in FIGS. 5A to 5C and 6A to 6C.

As apparent from these aberration charts and values for the conditions as in FIG. 14, in the image capture lens 10-3 of Example 1-3, various kinds of aberrations are preferably corrected all the area from the center to peripheries of the image at each magnification, thereby exhibiting optical performance suitable for capturing images.

Second Embodiment

A second embodiment of the present invention will now be described herein below. The same elements as those of the first embodiment are indicated by the same reference numerals and the description is appropriately omitted.

Figure 17:
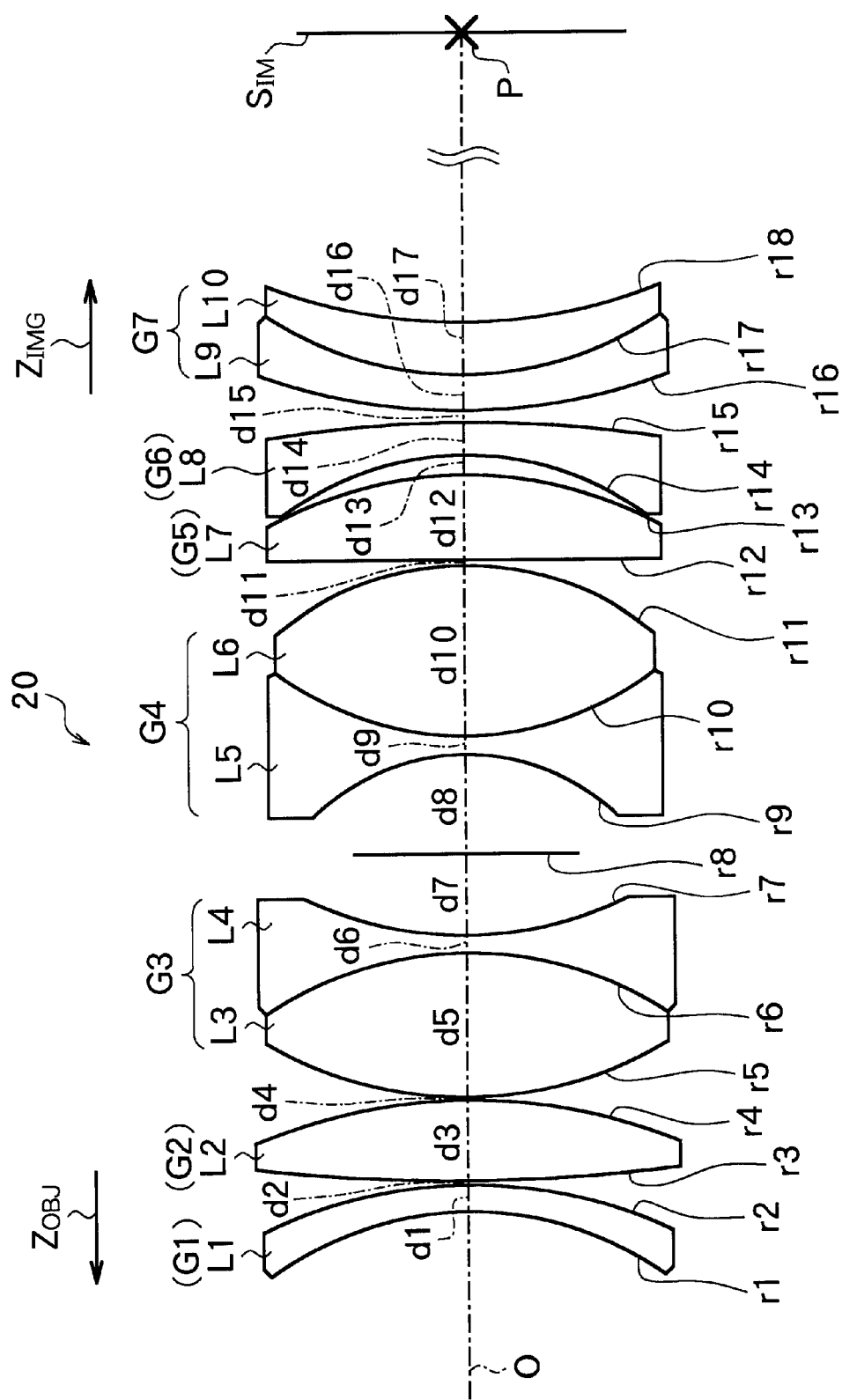
FIG. 17 is a cross sectional view showing the structure of the image capture lens according to a second embodiment of the invention.
Figure 20:
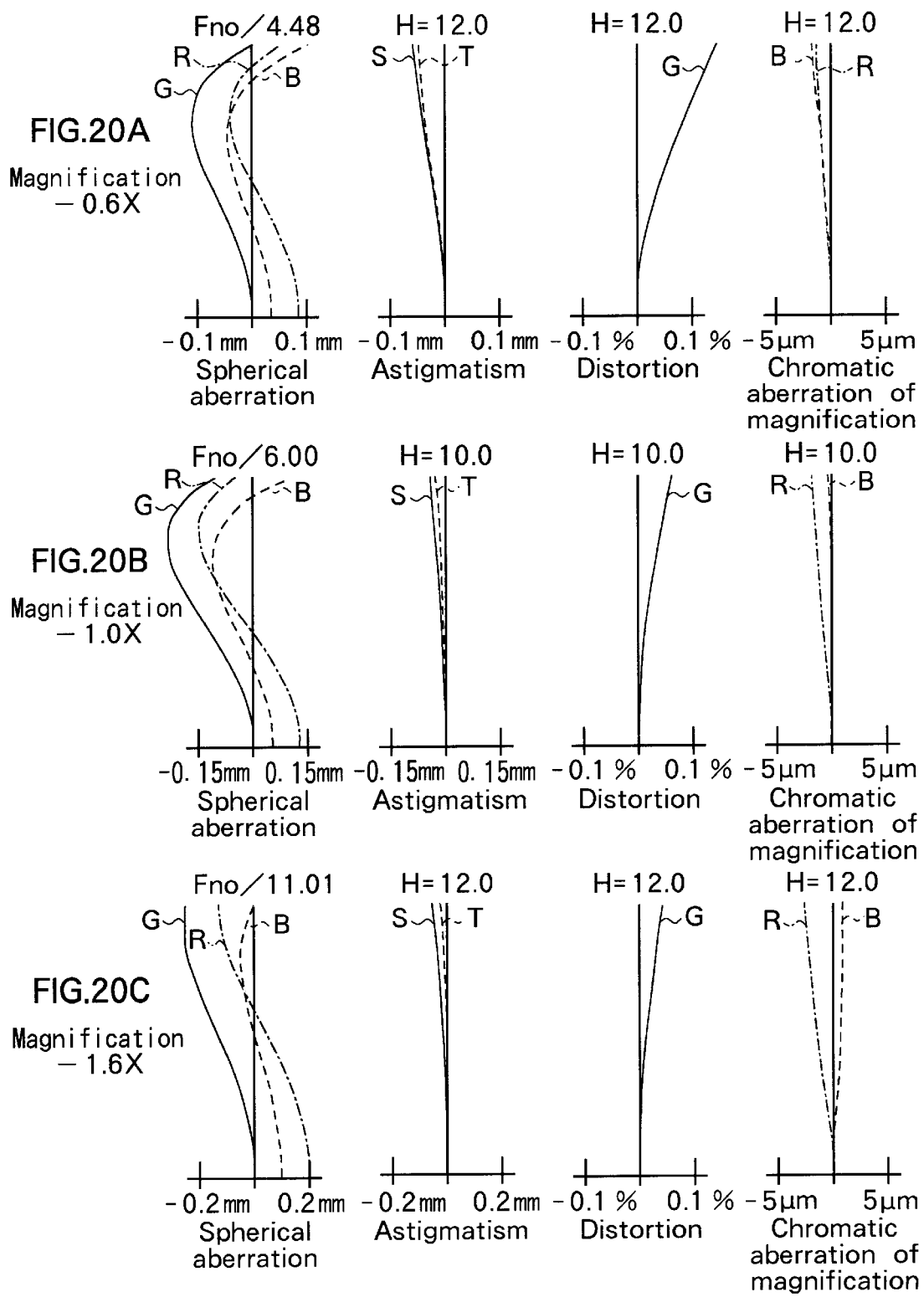
FIGS. 20A to 20C are aberration charts of spherical aberration, astigmatism, distortion and chromatic aberration of magnification at each magnification with regard to the image capture lens of Example 2-1 as in FIGS. 18A and 18B.
Figure 21:
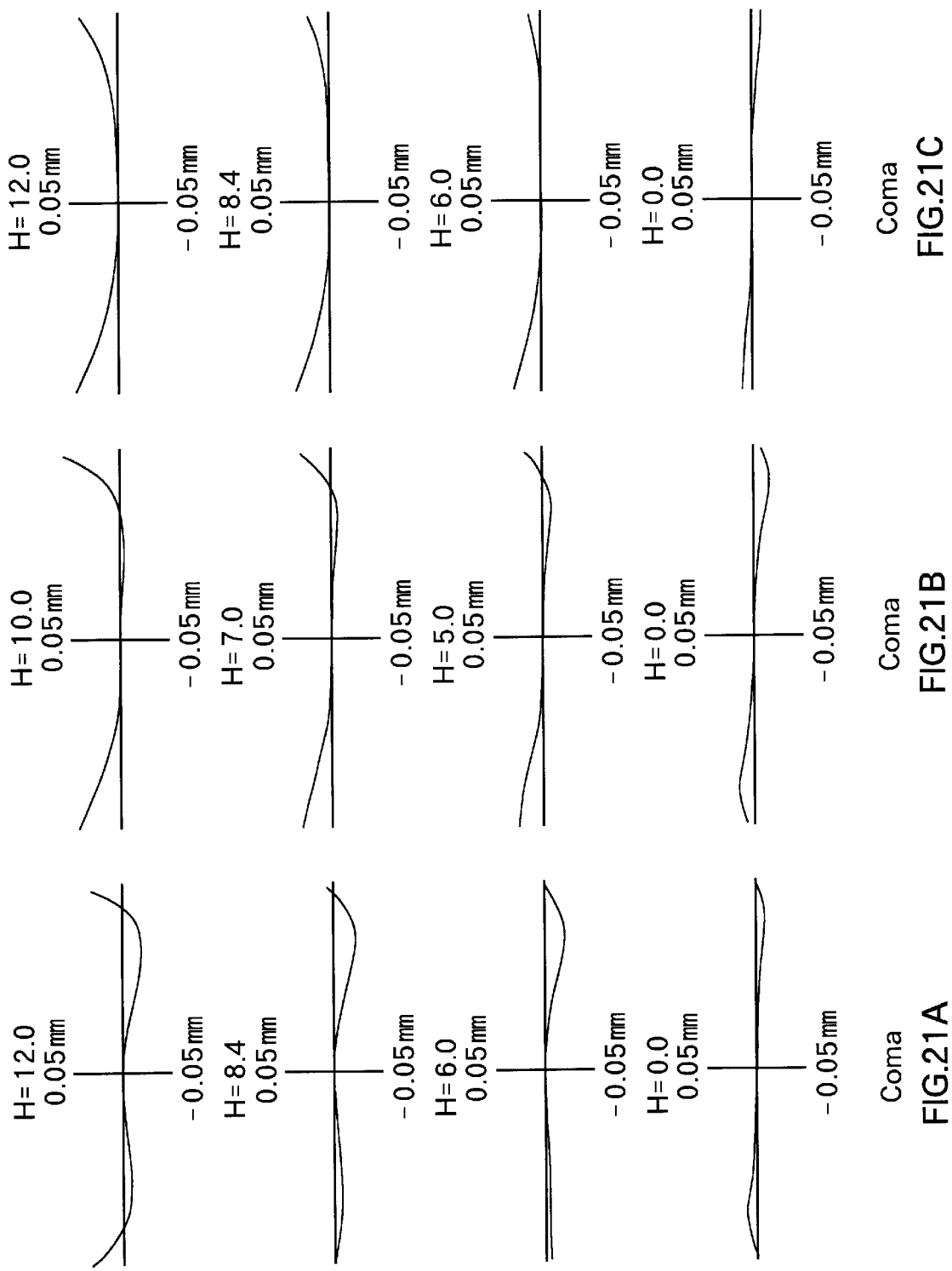
FIGS. 21A to 21C are aberration charts of coma at each magnification with regard to the image capture lens of Example 2-1 as in FIGS. 18A and 18B.

FIG. 17 is a schematic diagram of the configuration of the image capture lens 20 according to the second embodiment showing each lens element in cross section within a single plane including an optical axis O.

Similar to the image capture lens 10 of the first embodiment, the image capture lens 20 of the second embodiment is applicable to the readout optical system of the image capture apparatus 1 as in FIG. 1. In the image capture lens 20 successively from the object side provided are a first lens group G1 including a negative meniscus lens L1, a second lens group G2 including a positive lens L2 directing its convex to the object side, a third lens group G3 including a cemented lens which is composed of a bi-convex positive lens L3 and a bi-concave negative lens L4, the cemented lens having positive refractive power with its convex facing the object side, a fourth lens group G4 including a cemented lens which is composed of a bi-concave negative lens L5 and a bi-convex positive lens L6, the cemented lens having positive refractive power with its convex facing the image side, a fifth lens group G5 including a positive lens L7 directing its convex to the image side and a sixth lens group G6 including a negative lens L8 directing a surface thereof whose radius of curvature is small to the objective side.

In addition to these lens groups, the image capture lens 20 further comprises a seventh lens group G7 including a negative meniscus lens L9 and a positive lens L10. The seventh lens group G7 is provided on the image side relative to the sixth lens group G6. In the seventh lens group G7, the meniscus lens L9 and the positive lens L10 constitute a cemented lens directing its convex to the object side. Alternatively, the meniscus lens L9 and the positive lens L10 may be constituted having a clearance therebetween. Further, in the embodiment, the positive lens L10 has a meniscus shape directing its convex to the object side as in FIG. 17 but may have a bi-convex shape as shown in Example 2-2 to be described later.

In the embodiment, as shown in FIG. 17 the concave of the negative meniscus lens L1 in the first lens group G1 faces the object side, for example. The positive lens L2 in the second lens group L2 has a bi-convex shape, for example. The positive lens L7 in the fifth lens group G5 has a plano-concave shape, for example. The negative lens L8 in the sixth lens group G6 has a meniscus shape, directing its concave to the object side. However, shapes of the lens element are not limited to those illustrated in FIG. 17. For example, the negative meniscus lens L1 in the first lens group G1 have not only a shape such that its concave faces the object side but also the lens L1 have a shape such that its convex faces the object side as shown in Example 2-2 to be described later. For example, the negative lens L8 in the sixth lens group G6 takes not only a meniscus shape but also a bi-concave shape as shown in Example 2-2 to be described later.

Similar to the image capture lens 10 of the first embodiment, preferably the image capture lens 20 of the second embodiment satisfies the conditional expressions (1) to (3). The action and effect brought by satisfying the conditional expressions (1) to (3) are similar to those of the first embodiment.

When 'ν9' and 'ν10' are the Abbe number at d-line of the negative meniscus lens L9 and the positive lens L10 in the seventh lens group G7 and '$r_{16}$', '$r_{17}$' and '$r_{18}$' are the radius of curvature of lens surfaces of the seventh lens group G7 from the object side, preferably the image capture lens 20 of the second embodiment satisfies the following conditional expressions (6) to (8). '$\phi_T$' in the conditional expression (7) represents the refractive power of the entire lens system including all lens groups.

$$-0.2 < r_{16}/r_{18} < 1.2 \tag{6}$$

$$0.35 < \phi_T \cdot r_{17} < 1.2 \tag{7}$$

$$13 < \nu_9 - \nu_{10} \tag{8}$$

The conditional expression (6) provides a condition for preferably correcting curvature of field or coma in a part where field angle is large. In the image capture lens 20, if a radius of curvature $r_{16}$ of a 16th surface becomes large, exceeding the upper limit of the conditional expression (6), a change of an incident angle of a light entering the 16th surface relative to a change of a field angle becomes small, resulting in reducing the effect of correcting curvature of field. If a radius of curvature $r_{18}$ of an 18th surface becomes small, exceeding the conditional expression (6), astigmatism or coma flare at peripheries of a flux becomes large. Therefore, it is difficult to perform preferable correction of aberrations which is necessary for obtaining high resolution. If the refractive power of the concave becomes large in the seventh lens group G7, exceeding the lower limit of the conditional expression (6), correction to the curvature of field is difficult.

The conditional expression (7) defines the condition for effectively correcting aberration off the optical axis. In the case where the seventh lens group G7 constitutes the cemented lens, by defining the radius of curvature $r_{17}$ of the cemented surface within the range of the conditional expression (7), an influence on correction of the axial aberrations, particularly, spherical aberration is suppressed as well as aberration off the optical axis can be corrected.

The conditional expression (8) defines a condition on the correction of chromatic aberration of magnification. With respect to lenses L9 and L10 in the seventh lens group G7, by selecting a glass material so as to satisfy the conditional expression (8), obtained is a combination of the Abbe number of the convex lens and the Abbe number of the concave lens with which excess correction of chromatic aberration of magnification is achromatized, the excess correction of chromatic aberration of magnification occurring due to intensive correction of the axial chromatic aberration in the third lens group G3 and the fourth lens group G4.

Similar to the image capture lens 10 according to the first embodiment, the image capture lens 20 of the second embodiment constituted as described above exhibits optical performance such that color images provided by an original such as a negative film or positive film are captured by scaling them up or down crossing over the magnification of the actual size, for example. More specifically, in the image capture lens 20 of the second embodiment, auxiliary lens elements such as the lens L8 with negative power are added to the Gauss lens system. Thus, with the use of the lens material with high anomalous dispersion, each lens has moderate refractive power, so that bright optical performance in which various aberrations are preferably corrected over a wide magnification range, e.g., −0.6× to −1.6× is obtained. Scaling is performed in a manner that the entire lens system is shifted in accordance with the magnification, thereby changing object distance or image distance, for example.

As has been described in the image capture lens 20 according to the embodiment, optical performance suitable for capturing images is obtained, similar to the image capture lens 10 of the first embodiment.

EXAMPLE 2-1

Next, a first example (Example 2-1)of the image capture lens 20 according to the embodiment will now be described with reference to FIGS. 18A to 21C.

FIGS. 18A and 18B are tables of an image capture lens 20-1 using specific values according to Example 2-1. Symbols used in FIGS. 18A and 18B represent the same as those used in FIGS. 3A and 3B.

FIG. 18B shows values for the object distance and the image distance at three typical imaging magnification (−0.6×, −1.0× and −1.6×) of the image capture lens 20-1. The object distance d0 denotes a distance from an object point to a first lens surface S1 on the optical axis, while the image distance d18 denotes a distance from a last lens surface S18 to an image point on the optical axis.

FIG. 19 shows values corresponding to the conditional expressions (1) to (3) and (6) to (8). With reference to FIG. 18A, in the image capture lens 20-1 of Example 2-1, with respect to the positive lens L3 in the third lens group G3, the Abbe number $v_3$ at d-line is 71.3; the relative partial dispersion $\theta_3$ is 1.243; and the anomalous dispersion $\delta_3$ is 0.0263, which satisfies the conditional expression (1). With respect to the positive lens L6 in the fourth lens group G4, the Abbe number $v_6$ at d-line is 71.3; the relative partial dispersion $\theta_6$ is 1.243; and the anomalous dispersion $\delta_6$ is 0.0263, which satisfies the conditional expression (2).

In the image capture lens 20-1, the value for $\phi_3*\delta\theta_3 + \phi_6*\delta\theta_6$ is 0.124, which satisfies the conditional expression (3). The value for $r_{16}/r_{18}$ is 1.12, which satisfies the conditional expression (6). The value for $\phi_7*r_{17}$ is 0.45, which satisfies the conditional expression (7). The value for $v_9-v_{10}$ is 21.0, which satisfies the conditional expression (8).

FIGS. 20A to 20C are aberration charts of spherical aberration, astigmatism, distortion and chromatic aberration of magnification at each imaging magnification in the image capture lens 20-1. FIGS. 21A, 21B and 21C show aberrations at imaging magnification of −0.6×, −1.0× and −1.6×, respectively. FIGS. 20A to 20C also show effective F number (Fno) at each magnification. FIGS. 21A to 21C show coma at each imaging magnification in the image capture lens 20-1. FIGS. 21A, 21B and 21C show coma at magnification of −0.6×, −1.0× and −1.6×, respectively. Symbols in these aberration charts represent the same in FIGS. 5A to 5C and 6A to 6C.

As apparent from these aberration charts and values for the conditions as in FIG. 19, in the image capture lens 20-1 of Example 2-1, various kinds of aberrations are preferably corrected all the area from the center to peripheries of the image at each magnification, thereby exhibiting preferable optical performance suitable for capturing images.

EXAMPLE 2-2

With reference to FIGS. 22 to 26C, a second example (Example 2-2) of the image capture lens 20 of the embodiment will be described herein below.

Figure 22:
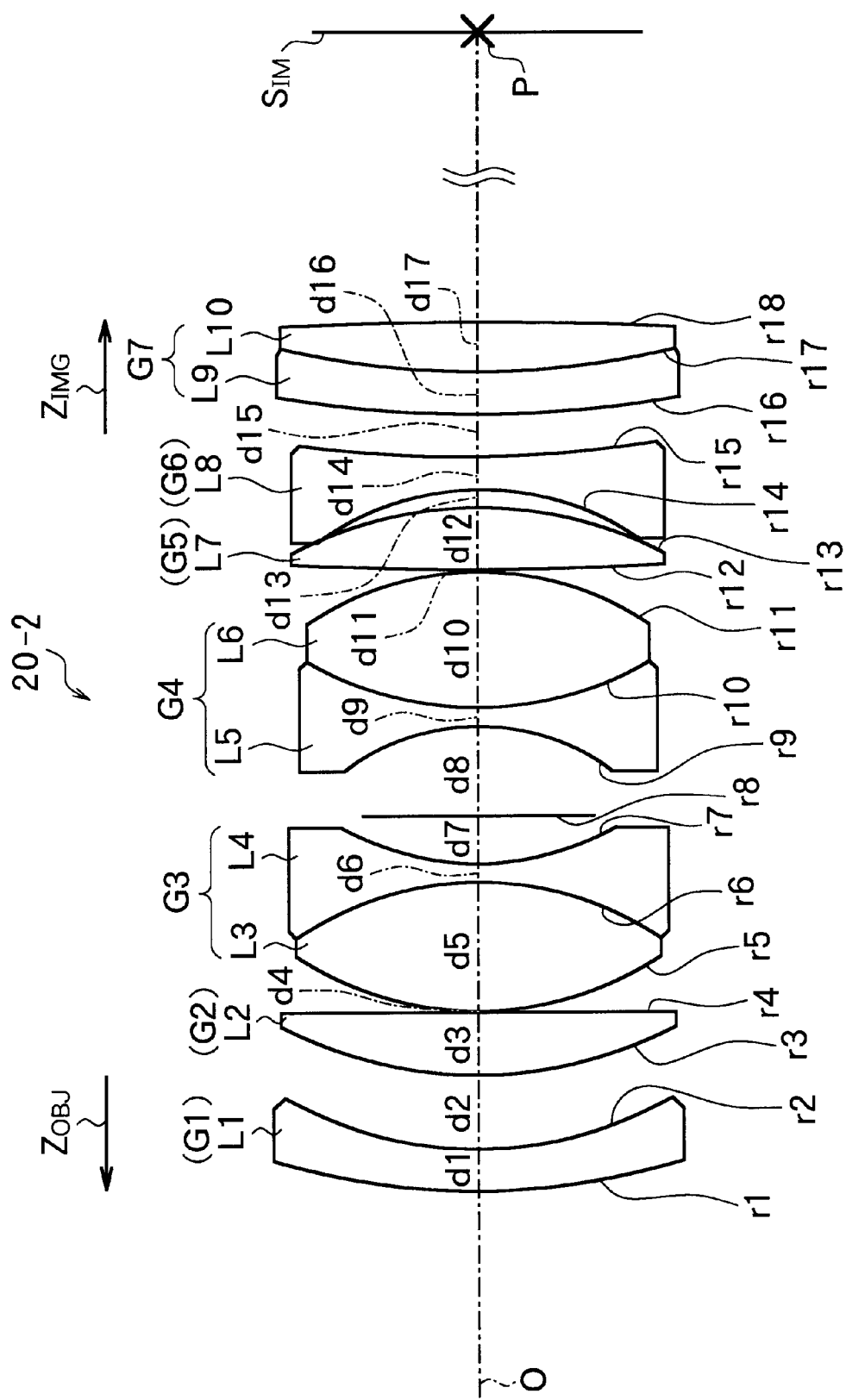
FIG. 22 is a cross sectional view showing the structure of the image capture lens according to a second example (Example 2-2)of the second embodiment of the invention.

FIGS. 23A and 23B are tables of an image capture lens 20-2 using specific values according to Example 2-2. FIG. 22 is illustrated corresponding to the values for elements of the image capture lens 20-2 as in FIGS. 23A and 23B. Symbols in FIG. 22 and FIGS. 23A and 23B represent the same as those in FIG. 2 and FIGS. 3A and 3B.

FIG. 23B shows values for the object distance and the image distance at three typical imaging magnification (−0.6×, −1.0× and −1.6×) of the image capture lens 20-2. The object distance $d_0$ denotes a distance from an object point to a first lens surface S1 on the optical axis, while the image distance $d_{18}$ denotes a distance from a last lens surface S18 to an image point on the optical axis.

FIG. 24 shows values corresponding to the conditional expressions (1) to (3) and (6) to (8). With reference to FIG. 23A, in the image capture lens 20-2 of Example 2-2, with respect to the positive lens L3 in the third lens group G3, the Abbe number $v_3$ at d-line is 71.3; the relative partial dispersion $\theta_3$ is 1.243; and the anomalous dispersion $\delta_3$ is 0.0263, which satisfies the conditional expression (1). With respect to the positive lens L6 in the fourth lens group G4, the Abbe number $v_6$ at d-line is 71.3; the relative partial dispersion $\theta_6$ is 1.243; and the anomalous dispersion $\delta_6$ is 0.0263, which satisfies the conditional expression (2).

In the image capture lens 20-2, the value for $\phi_3*\delta\theta_3 + \phi_6*\delta\theta_6$ is 0.135, which satisfies the conditional expression (3). The value for $r_{16}/r_{18}$ is −0.10, which satisfies the conditional expression (6). The value for $\phi_7*r_{17}$ is 1.09, which satisfies the conditional expression (7). The value for $v_9-v_{10}$ is 13.8, which satisfies the conditional expression (8).

Figure 25A:
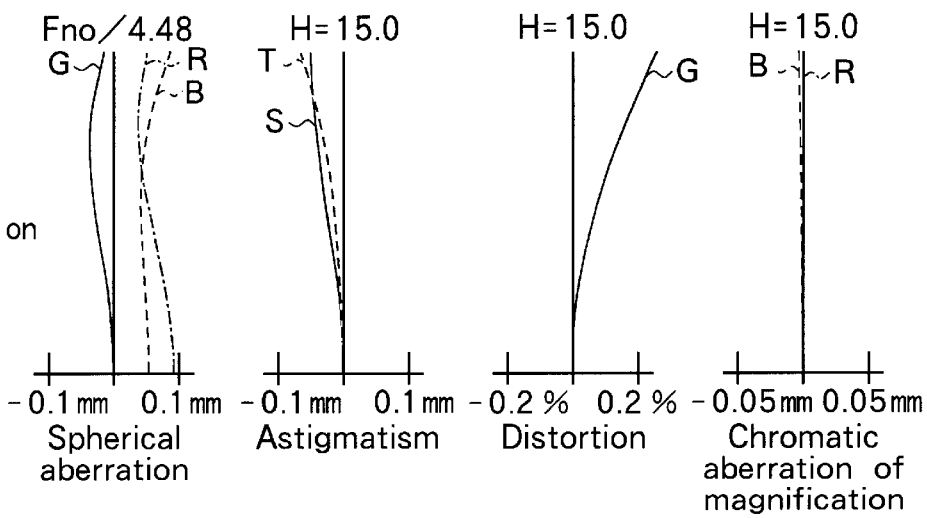
FIGS. 25A to 25C are aberration charts of spherical aberration, astigmatism, distortion and chromatic aberration of magnification at each magnification with regard to the image capture lens of Example 2-2 as in FIGS. 23A and 23B.
Figure 25B:
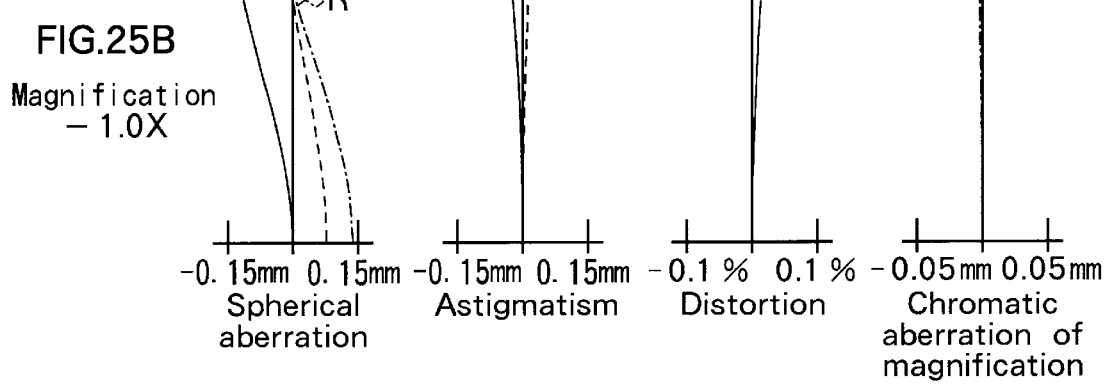
Figure 25C:
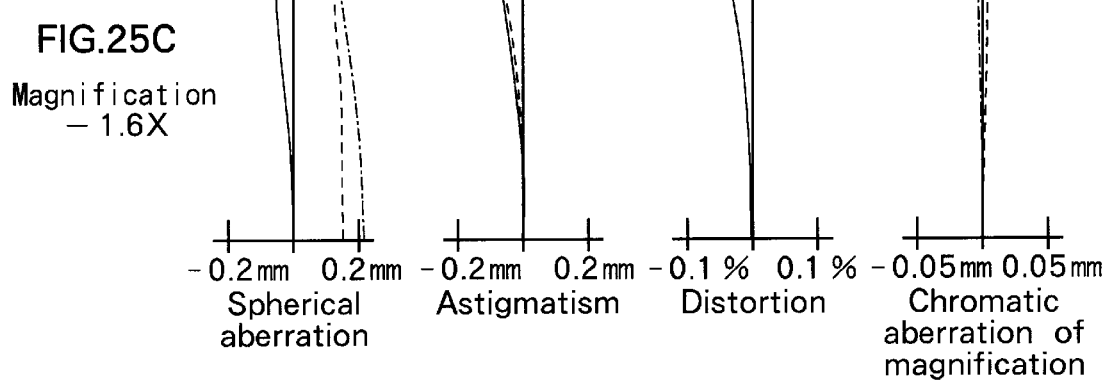

FIGS. 25A to 25C are aberration charts of spherical aberration, astigmatism, distortion and chromatic aberration of magnification at each imaging magnification in the image capture lens 20-2. FIGS. 25A, 25B and 25C show aberrations at magnification of −0.6×, −1.0× and −1.6×, respectively. FIGS. 25A to 25C also show effective F number (Fno) at each magnification. FIGS. 26A to 26C show coma at each imaging magnification in the image capture lens 20-2. FIGS. 26A, 26B and 26C show coma at magnification of −0.6×, −1.0× and −1.6×, respectively. Symbols in these aberration charts represent the same as those in FIGS. 5A to 5C and 6A to 6C.

As apparent from these aberration charts and values for the conditions as in FIG. 24, in the image capture lens 20-2 of Example 2-2, various kinds of aberrations are preferably corrected all the area from the center to peripheries of the image at each magnification, thereby exhibiting preferable optical performance suitable for capturing images.

The present invention is not limited to the above embodiments and various modifications are possible. For example, values of each lens element such as the radius of curvature r, the surface separation d, the refractive index n and the Abbe number v are not limited to the values shown in the above examples and may take other values.

According to the image capture lens of the invention, successively from an object side provided are a first lens group including a negative meniscus lens; a second lens group including a positive lens directing its convex to the object side; a third lens group including a first cemented lens composed of a bi-convex positive lens and a bi-concave negative lens, the first cemented lens having positive refractive power and directing its convex to the object side; a fourth lens group including a second cemented lens composed of a bi-concave negative lens and a bi-convex positive lens, the second cemented lens having negative refractive power and directing its convex to an image side; a fifth lens group including a positive lens directing its convex to the image side; and a sixth lens group including a negative lens directing its concave to the object side. Thus, various kinds of aberrations are corrected and optical performance suitable for capturing images is obtained.

According to the image capture lens of another aspect of the invention, successively from an object side provided are a first lens group including a negative meniscus lens; a second lens group including a positive lens directing its convex to the object side; a third lens group including a first cemented lens composed of a bi-convex positive lens and a bi-concave negative lens, the first cemented lens having positive refractive power and directing its convex to an image side; a fourth lens group including a second cemented lens composed of a bi-concave negative lens and a bi-convex positive lens, the second cemented lens directing its convex to the image side; a fifth lens group including a positive lens directing its convex to the image side; a sixth lens group including a negative lens directing a surface thereof to the object side, a radius of the surface being smaller than that of an opposite surface; and a seventh lens group including a negative meniscus lens and a positive lens. Thus, various kinds of aberrations are corrected and high-quality images are read.

According to the image capture lens of still another aspect of the invention, $0.09<(\phi_3*\delta\theta_3+\phi_6*\delta\theta_6)/\phi_T<0.15$ is satisfied when the $\phi_3$ and the $\delta\theta_3$ represent refractive power and anomalous dispersion of the positive lens in the third lens group, respectively, the $\phi_6$ and the $\delta\theta_6$ represent refractive power and anomalous dispersion of the positive lens in the fourth lens group, respectively, and the $\phi_T$ represents refractive power of an entire lens system including all the lens groups, for example. Thus, the third lens group and the fourth lens group have moderate refractive power with the use of a lens material having large anomalous dispersion. Accordingly, chromatic aberration is preferably corrected in particular.

According to the image capture apparatus of the invention, in the image capture lens successively from an object side provided are a first lens group including a negative meniscus lens; a second lens group including a positive lens directing its convex to the object side; a third lens group including a first cemented lens composed of a bi-convex positive lens and a bi-concave negative lens, the first cemented lens having positive refractive power and directing its convex to an image side; a fourth lens group including a second cemented lens composed of a bi-concave negative lens and a bi-convex positive lens, the second cemented lens having negative refractive power and directing its convex to the image side; a fifth lens group including a positive lens directing its convex to the image side; and a sixth lens group including a negative lens directing its concave to the object side. Thus, in the image capture lens, various kinds of aberrations are corrected. Accordingly, optical performance suitable for capturing images is obtained and high-quality image capturing is possible.

According to the image capture lens of yet another aspect of the invention, successively from an object side provided are a first lens group including a negative meniscus lens; a second lens group including a positive lens directing its convex to the object side; a third lens group including a first cemented lens composed of a bi-convex positive lens and a bi-concave negative lens, the first cemented lens having positive refractive power and directing its convex to the object side; a fourth lens group including a second cemented lens composed of a bi-concave negative lens and a bi-convex positive lens, the second cemented lens directing its convex to an image side; a fifth lens group including a positive lens directing its convex to the image side; a sixth lens group including a negative lens directing a surface thereof to the object side, a radius of the surface being smaller than that of an opposite surface; and a seventh lens group including a negative meniscus lens and a positive lens. In the image capture lens, various kinds of aberrations are corrected. Thus, optical performance suitable for capturing images is obtained and high-quality image capturing is possible.

Obviously many modifications and variations of the present invention are possible in the light of the above teachings. It is therefore to be understood that within the scope of the appended claims the invention may be practiced otherwise than as specifically described.

What is claimed is:

1. An image capture lens, comprising successively from an object side:

a first lens group including a negative meniscus lens;

a second lens group including a positive lens directing its convex to the object side;

a third lens group including a first cemented lens composed of a bi-convex positive lens and a bi-concave negative lens, the first cemented lens having positive refractive power and directing its convex to the object side;

a fourth lens group including a second cemented lens composed of a bi-concave negative lens and a bi-convex positive lens, the second cemented lens having negative refractive power and directing its convex to an image side;

a fifth lens group including a positive lens directing its convex to the image side; and a sixth lens group including a negative lens directing its concave to the object side.

2. An image capture lens according to claim 1, wherein expressions $65<v_3$, $0.015<\delta\theta_3$, $65<v_6$ and $0.015<\delta\theta_6$ are satisfied when the $v_3$ and the $\delta\theta_3$ represent Abbe number for a wavelength of d-line and anomalous dispersion of the positive lens in the third lens group, respectively and the $v_6$ and the $\delta\theta_6$ represent Abbe number for the wavelength of d-line and anomalous dispersion of the positive lens in the fourth lens group, respectively and the expressions are satisfied on the condition that anomalous dispersion $\delta\theta_{g,d}$ is expressed by $\delta\theta_{g,d}=\theta_{g,d}-(1.365-0.00208*v_d)$ where the $v_d$ represents Abbe number for the wavelength of d-line; the relative partial dispersion $\theta_{g,d}$ for wavelengths of g-line and d-line is expressed by $\theta_{g,d}=(n_g-n_d)/(n_F-n_C)$ where the $n_g$, the $n_d$, the $n_F$ and the $n_c$ represent refractive index for wavelengths for g-line, d-line, F-line and C-line, respectively; and $\delta\theta_i$ and $v_i$ represent the anomalous dispersion $\delta\theta_{g,d}$ and the Abbe number vd of the 'i'th lens from the object side, respectively.

3. An image capture lens according to claim 2, wherein $$0.09<(\phi_3*\delta\theta_3+\phi_6*\delta\theta_6)/\phi_T<0.15,$$

$$0.75<(n_3*v_4)/(n_4*v_3)<1.10 \text{ and}$$

$$-13.0<\phi_T^2/(\phi_{3,4}*\phi_{5,6})<-0.3$$

are satisfied when the $\phi_3$ and the $\delta\theta_3$ represent refractive power and anomalous dispersion of the positive lens in the third lens group, respectively, the $\phi_6$ and the $\delta\theta_6$ represent refractive power and anomalous dispersion of the positive lens in the fourth lens group, respectively, the $v_3$ and the $n_3$ represent Abbe number and refractive index for the wavelength of d-line of the positive lens in the third lens group, respectively, the $v_4$ and the $n_4$ represent Abbe number and refractive index for the wavelength of d-line of the negative lens in the third lens group, respectively, and the $\phi_{3,4}$ represents refractive power of the entire cemented lens in the third lens group, $\phi_{5,6}$ represents the refractive power of the entire cemented lens in the fourth lens group and the $\phi_T$ represents refractive power of an entire lens system including all the lens groups.

4. An image capture lens, comprising successively from an object side:

a first lens group including a negative meniscus lens;

a second lens group including a positive lens directing its convex to the object side;

a third lens group including a first cemented lens composed of a bi-convex positive lens and a bi-concave negative lens, the first cemented lens having positive refractive power and directing its convex to the object side;

a fourth lens group including a second cemented lens composed of a bi-concave negative lens and a bi-convex positive lens, the second cemented lens directing its convex to the image side;

a fifth lens group including a positive lens directing its convex to the image side;

a sixth lens group including a negative lens directing a surface thereof to the object side, a radius of the surface being smaller than that of an opposite surface; and a seventh lens group including a negative meniscus lens and a positive lens.

5. An image capture lens according to claim 4, wherein a third cemented lens is composed of the negative meniscus lens and the positive lens in the seventh lens group, the third cemented lens directing its convex to the object side.

6. An image capture lens according to claim 4, wherein expressions $65<v_3$, $0.015<\delta\theta_3$, $65<v_6$ and $0.015<\delta\theta_6$ are satisfied when the $v_3$ and the $\delta\theta_3$ represent Abbe number for the wavelength of d-line and anomalous dispersion of the positive lens in the third lens group, respectively and the $v_6$ and the $\delta\theta\theta$ represent Abbe number for the wavelength of d-line and anomalous dispersion of the positive lens in the fourth lens group, respectively, and the expressions are satisfied on the condition that anomalous dispersion $\delta\theta_{g,d}$ is expressed by $\delta\theta_{g,d}=\theta_{g,d}-(1.365-0.00208*v_d)$ where the $v_d$ represents Abbe number for the wavelength of d-line; the relative partial dispersion $\theta_{g,d}$ for wavelengths of g-line and d-line is expressed by $\theta_{g,d}=(n_g-n_d)/(n_F-n_C)$ where the $n_g$, the $n_d$, the $n_F$ and the $n_C$ represent refractive index for wavelengths for g-line, d-line, F-line and C-line, respectively; and $\delta\theta_i$ and $v_i$ represent the anomalous dispersion $\delta\theta_{g,d}$ and the Abbe number $v_d$ of the 'i'th lens from the object side, respectively.

7. An image capture lens according to claim 6, wherein a third cemented lens is composed of the negative meniscus lens and the positive lens in the seventh lens group, the third cemented lens directing its convex to the object side.

8. An image capture lens according to claim 6, wherein $$0.09<(\phi_3*\delta\theta_3+\phi_6*\delta\theta_6)/\phi_T<0.15$$

is satisfied when the $\phi_3$ and the $\delta\theta_3$ represent refractive power and anomalous dispersion of the positive lens in the third lens group, respectively, the $\phi_6$ and the $\delta\theta_6$ represent refractive power and anomalous dispersion of the positive lens in the fourth lens group, respectively and the $\phi_T$ represents refractive power of an entire lens system including all the lens groups, and $-0.2<r_{16}/r_{18}<1.2$, $0.35<\phi_T*r_{17}<1.2$ and $13<v_9-v_{10}$ are satisfied when the $v_9$ and the $v_{10}$ represent Abbe number for the wavelength of d-line of the negative meniscus lens and the positive lens in the seventh lens group, respectively and the $r_{16}$, the $r_{17}$ and the $r_{18}$ represent radius of curvature of lens surfaces of the seventh lens group in this order from the object side.

9. An image capture lens according to claim 8, wherein a third cemented lens is composed of the negative meniscus lens and the positive lens in the seventh lens group, the third cemented lens directing its convex surface to the object side.

10. An image capture apparatus for reading an image through an image capture lens, the image capture lens comprising successively from an object side:

a first lens group including a negative meniscus lens;

a second lens group including a positive lens directing its convex to the object side;

a third lens group including a first cemented lens composed of a bi-convex positive lens and a bi-concave negative lens, the first cemented lens having positive refractive power and directing its convex to the object side;

a fourth lens group including a second cemented lens composed of a bi-concave negative lens and a bi-convex positive lens, the second cemented lens having negative refractive power and directing its convex to an image side;

a fifth lens group including a positive lens directing its convex to the image side; and a sixth lens group including a negative lens directing its concave to the object side.

11. An image capture apparatus for reading an image through an image capture lens, the image capture lens comprising successively from an object side:

a first lens group including a negative meniscus lens;

a second lens group including a positive lens directing its convex to the object side;

a third lens group including a first cemented lens composed of a bi-convex positive lens and a bi-concave negative lens, the first cemented lens having positive refractive power and directing its convex to the object side;

a fourth lens group including a second cemented lens composed of a bi-concave negative lens and a bi-convex positive lens, the second cemented lens directing its convex to an image side;

a fifth lens group including a positive lens directing its convex to the image side;

a sixth lens group including a negative lens directing a surface thereof to the object side, a radius of the surface being smaller than that of an opposite surface; and a seventh lens group including a negative meniscus lens and a positive lens.

* * * * *